United States Patent
Kirk et al.

(10) Patent No.: US 9,336,025 B2
(45) Date of Patent: May 10, 2016

(54) SYSTEMS AND METHODS OF ANALYZING A SOFTWARE COMPONENT

(71) Applicant: The Boeing Company, Chicago, IL (US)

(72) Inventors: Terrance J. Kirk, Annapolis Junction, MD (US); Matthew S. Bialek, Annapolis, MD (US); Shaun Kospiah, Laurel, MD (US); Timothy M. Lemm, Bowie, MD (US); Scott G. Thompson, West Henrietta, NY (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/941,325

(22) Filed: Jul. 12, 2013

(65) Prior Publication Data

US 2015/0020066 A1    Jan. 15, 2015

(51) Int. Cl.
*H04L 29/00* (2006.01)
*G06F 9/455* (2006.01)
*G06F 21/56* (2013.01)

(52) U.S. Cl.
CPC ............... *G06F 9/455* (2013.01); *G06F 21/56* (2013.01)

(58) Field of Classification Search
CPC ............................... G06F 15/16; H04L 12/26
USPC ............................. 726/22; 370/252; 709/203
See application file for complete search history.

(56) References Cited

U.S. PATENT DOCUMENTS

| | | |
|---|---|---|
| 6,487,666 B1 | 11/2002 | Shanklin et al. |
| 6,839,850 B1 | 1/2005 | Campbell et al. |
| 6,981,279 B1 | 12/2005 | Arnold et al. |
| 7,084,760 B2 | 8/2006 | Himberger et al. |
| 7,096,498 B2 | 8/2006 | Judge |
| 7,143,113 B2 | 11/2006 | Radatti |
| 7,213,260 B2 | 5/2007 | Judge |
| 7,360,249 B1 | 4/2008 | Szor et al. |
| 7,398,553 B1 | 7/2008 | Li |
| 7,434,261 B2 | 10/2008 | Costea et al. |
| 7,540,030 B1 | 5/2009 | Zaitsev |
| 7,657,935 B2 | 2/2010 | Stolfo et al. |
| 7,779,472 B1 | 8/2010 | Lou |

(Continued)

FOREIGN PATENT DOCUMENTS

| | | |
|---|---|---|
| EP | 1708114 A2 | 10/2006 |
| WO | 2004021637 A1 | 3/2004 |

(Continued)

OTHER PUBLICATIONS

Basic Dynamic Analysis, Malware Analysis CS498sh; Fall 2012, (21 pages).

(Continued)

*Primary Examiner* — Anthony Brown
*Assistant Examiner* — Michael D Anderson
(74) *Attorney, Agent, or Firm* — Toler Law Group, PC

(57) ABSTRACT

A particular method includes receiving, at a device, a request to analyze a software component. The request indicates a target operating system. The method also includes generating a virtual machine at a computing device. The virtual machine implements the target operating system. The method further includes executing the software component in the target operating system on the virtual machine and generating data indicating effects of executing the software component on the virtual machine.

20 Claims, 14 Drawing Sheets

(56) References Cited

U.S. PATENT DOCUMENTS

| | | | |
|---|---|---|---|
| 8,161,130 B2 | 4/2012 | Stokes et al. | |
| 8,191,146 B2 | 5/2012 | Di Crescenzo et al. | |
| 8,205,258 B1 | 6/2012 | Chang et al. | |
| 8,256,003 B2 | 8/2012 | Dadhia et al. | |
| 8,370,931 B1 | 2/2013 | Chien et al. | |
| 8,381,298 B2 | 2/2013 | Blumfield et al. | |
| 8,402,541 B2 | 3/2013 | Craioveanu et al. | |
| 8,413,235 B1 | 4/2013 | Chen et al. | |
| 8,413,247 B2 | 4/2013 | Hudis et al. | |
| 8,429,629 B2 * | 4/2013 | Drepper | 717/148 |
| 8,443,441 B2 | 5/2013 | Stolfo et al. | |
| 8,479,296 B2 | 7/2013 | Mashevsky et al. | |
| 8,484,338 B2 | 7/2013 | Paster | |
| 8,528,086 B1 | 9/2013 | Aziz | |
| 8,555,392 B2 | 10/2013 | Golovkin | |
| 8,560,593 B2 * | 10/2013 | Ghostine | 709/201 |
| 8,572,743 B2 | 10/2013 | Di Crescenzo et al. | |
| 8,578,498 B2 | 11/2013 | Di Crescenzo et al. | |
| 8,661,547 B1 | 2/2014 | Kononov et al. | |
| 8,719,925 B1 | 5/2014 | Berg | |
| 8,813,222 B1 | 8/2014 | Codreanu et al. | |
| 2003/0023864 A1 | 1/2003 | Muttik et al. | |
| 2003/0140049 A1 | 7/2003 | Radatti | |
| 2003/0167402 A1 | 9/2003 | Stolfo et al. | |
| 2003/0212902 A1 | 11/2003 | Van Der Made | |
| 2004/0255165 A1 | 12/2004 | Szor | |
| 2004/0260945 A1 | 12/2004 | Raikar et al. | |
| 2005/0018618 A1 * | 1/2005 | Mualem et al. | 370/252 |
| 2005/0262556 A1 | 11/2005 | Waisman et al. | |
| 2006/0136720 A1 | 6/2006 | Armstrong et al. | |
| 2007/0006028 A1 | 1/2007 | Desouza et al. | |
| 2007/0044160 A1 | 2/2007 | Ishibashi | |
| 2007/0056035 A1 | 3/2007 | Copley | |
| 2007/0079375 A1 | 4/2007 | Copley | |
| 2007/0174915 A1 | 7/2007 | Gribble et al. | |
| 2007/0240217 A1 | 10/2007 | Tuvell et al. | |
| 2007/0240222 A1 | 10/2007 | Tuvell et al. | |
| 2008/0016570 A1 | 1/2008 | Capalik | |
| 2008/0047009 A1 | 2/2008 | Overcash et al. | |
| 2008/0086776 A1 | 4/2008 | Tuvell et al. | |
| 2008/0109871 A1 | 5/2008 | Jacobs | |
| 2008/0127336 A1 | 5/2008 | Sun et al. | |
| 2008/0134337 A1 | 6/2008 | Crescenzo et al. | |
| 2008/0141371 A1 | 6/2008 | Bradicich et al. | |
| 2008/0178294 A1 | 7/2008 | Hu et al. | |
| 2008/0196099 A1 | 8/2008 | Shastri | |
| 2008/0196104 A1 | 8/2008 | Tuvell et al. | |
| 2008/0262991 A1 | 10/2008 | Kapoor et al. | |
| 2008/0263659 A1 | 10/2008 | Alme | |
| 2008/0288493 A1 | 11/2008 | Yang et al. | |
| 2008/0295174 A1 | 11/2008 | Fahmy et al. | |
| 2008/0301810 A1 | 12/2008 | Lehane et al. | |
| 2008/0320594 A1 | 12/2008 | Jiang | |
| 2009/0038015 A1 | 2/2009 | Diamant et al. | |
| 2009/0070878 A1 | 3/2009 | Wang et al. | |
| 2009/0126016 A1 | 5/2009 | Sobko et al. | |
| 2009/0199296 A1 | 8/2009 | Xie et al. | |
| 2010/0031353 A1 | 2/2010 | Thomas et al. | |
| 2010/0058473 A1 | 3/2010 | Breitenbacher | |
| 2010/0115617 A1 | 5/2010 | Weber et al. | |
| 2010/0132038 A1 | 5/2010 | Zaitsev | |
| 2010/0142371 A1 | 6/2010 | Gooch et al. | |
| 2010/0162395 A1 | 6/2010 | Kennedy | |
| 2010/0192222 A1 | 7/2010 | Stokes et al. | |
| 2010/0263049 A1 | 10/2010 | Cross et al. | |
| 2011/0078794 A1 | 3/2011 | Manni et al. | |
| 2011/0185423 A1 | 7/2011 | Sallam | |
| 2012/0017275 A1 | 1/2012 | Harmonen | |
| 2012/0079596 A1 | 3/2012 | Thomas et al. | |
| 2012/0159181 A1 | 6/2012 | Di Crescenzo et al. | |
| 2012/0167223 A1 | 6/2012 | Di Crescenzo et al. | |
| 2012/0174227 A1 | 7/2012 | Mashevsky et al. | |
| 2012/0222120 A1 | 8/2012 | Rim et al. | |
| 2012/0304244 A1 | 11/2012 | Xie et al. | |
| 2012/0317306 A1 | 12/2012 | Radinsky et al. | |
| 2012/0330863 A1 | 12/2012 | McDougal et al. | |
| 2013/0055396 A1 | 2/2013 | Wang et al. | |
| 2013/0111547 A1 | 5/2013 | Kraemer | |
| 2013/0139265 A1 | 5/2013 | Romanenko et al. | |
| 2013/0167236 A1 | 6/2013 | Sick | |
| 2013/0227300 A1 | 8/2013 | Golovkin | |
| 2014/0130161 A1 | 5/2014 | Golovanov | |
| 2014/0150100 A1 | 5/2014 | Gupta et al. | |
| 2014/0157407 A1 | 6/2014 | Krishnan et al. | |
| 2014/0351810 A1 | 11/2014 | Pratt et al. | |
| 2015/0007325 A1 | 1/2015 | Eliseev et al. | |
| 2015/0019915 A1 | 1/2015 | Kospiah et al. | |

FOREIGN PATENT DOCUMENTS

| | | |
|---|---|---|
| WO | 2008001972 A1 | 1/2008 |
| WO | 2012162102 A1 | 11/2012 |

OTHER PUBLICATIONS

"Cisco Adaptive Wireless Intrusion Prevention System", 2008, Cisco Systems Incorporated, San Jose, California, pp. 1-8.

U.S. Appl. No. 13/941,361, filed Jul. 12, 2013, 50 pages.

U.S. Appl. No. 13/941,384, filed Jul. 12, 2013, 50 pages.

U.S. Appl. No. 14/042,153, filed Sep. 30, 2013, 34 pages.

Borisov, N., et al. "A Generic Application-Level Protocol Analyzer and its Language", Feb. 2005, Microsoft Research, Redmond, Washington, pp. 1-13.

Dai, S., et al. "MAPMon: A Host-Based Malware Detection Tool," 13th IEEE International Symposium on Pacific Rim Dependable Computing, Oct. 13, 2008, IEEE, Piscataway, New Jersey, pp. 349-356.

Leidl, B., et al. "Snort TCP Stream Reassembly Integer Overflow Vulnerability", CORE-2003-0307, Apr. 15, 2003, Core Security Technologies, Boston, Massachusetts, 5 pages.

Mell, P., et al. "Guide to Malware Incident Prevention and Handling", NIST Special Publication 800-83, Nov. 2005, National Institute of Standards and Technology, Gaithersburg, Maryland, 101 pages.

Raja, S., "Network Intrusion Prevention Systems—Why 'Always On' Stateful Inspection and Deep Packet Analysis are Essential to Deliver Non-Stop Protection", Jan. 26, 2005, Top Layer Networks Inc., Hudson, Massachusetts, 12 pages.

Rajaram, S., et al. "Client-Friendly Classification over Random Hyperplane Hashes", Machine Learning and Knowledge Discovery in Databases, 2008, vol. 5212, Springer-Verlag Berlin Heidelberg, Berlin, Germany, pp. 250-265.

Sekar, R., "A High-Performance Network Intrusion Detection System", In Proceedings of the 6th ACM conference on Computer and communications security,1999, Association for Computing Machinery, New York, New York, 10 pages.

Young, G., "Management Update: The Future of Intrusion Prevention, Going Beyond Detection", Oct. 13, 2004, Gartner, Inc., Stamford, Connecticut, 14 pages.

International Search Report and Written Opinion for International Application No. PCT/US2014/041555, ISA/EPO, Date of Mailing: Oct. 1, 2014, 9 pages.

Extended European Search Report for EP Application No. 14179336.4 from the European Patent Office dated Feb. 2, 2015, 5 pages.

* cited by examiner

SYSTEMS AND METHODS OF ANALYZING A SOFTWARE COMPONENT

FIELD OF THE DISCLOSURE

The present disclosure is generally related to systems and methods of analyzing a software component.

BACKGROUND

Malware includes software components that may be used to disrupt computer operation, gather sensitive information, gain access to private computer systems, or for other undesirable purposes. The malware may be designed to take advantage of security vulnerabilities of various systems (e.g., an operating system, an application, or a browser plug-in). Reverse engineering to determine effects of executing the malware may enable discovery of particular security vulnerabilities targeted by the malware and may enable detection of the malware.

Analyzing effects of executing the malware may be a labor-intensive process that takes hours, days, or even weeks. An analysis tool to analyze the malware may be limited to a particular operating environment. The particular operating environment may not be representative of a target operating environment of interest to an analyst. Moreover, collective evaluation of the malware by a team of analysts may be cumbersome to undertake.

SUMMARY

Systems and methods to analyze a software component are disclosed. The disclosed embodiments enable analyzing effects of executing the software component in a virtual machine. The virtual machine may implement a target operating system indicated in a request to analyze the software component. Procedures to analyze the software may be recommended based on comparing a digital identifier of the software component to digital identifiers in a database. For example, a particular analysis procedure may be recommended to analyze the software component in response to the digital identifier being related to another digital identifier in the database. Kernel level events and application level events of the virtual machine may be monitored during execution of the software component. The software component may be analyzed based on the detected kernel level events and the application level events.

In a particular embodiment, a method includes receiving, at a device, a request to analyze a software component. The request indicates a target operating system. The method also includes generating a virtual machine at a computing device. The virtual machine implements the target operating system. The method further includes executing the software component in the target operating system on the virtual machine and generating data indicating effects of executing the software component on the virtual machine.

In another particular embodiment, a system includes a processor and a memory. The memory stores instructions that, when executed by the processor, cause the processor to perform operations. The operations include receiving, at a device, a request to analyze a first software component. The request indicates a target operating system. The operations also include generating a virtual machine at a computing device. The virtual machine implements the target operating system. The operations further include executing the first software component in the target operating system on the virtual machine and generating first data indicating effects of executing the first software component on the virtual machine.

In another particular embodiment, a computer-readable storage device stores instructions that, when executed by a processor, cause the processor to perform operations. The operations include receiving, at a device, a request to analyze a software component. The request indicates a target operating system. The operations also include generating a virtual machine at a computing device. The virtual machine implements the target operating system. The operations further include executing the software component in the target operating system on the virtual machine and generating first data indicating effects of executing the software component on the virtual machine.

Thus, particular embodiments facilitate analysis of software components. A software component may be analyzed in a virtual machine implementing a requested operating environment that represents a client operating environment. Collective evaluation of the software component may be facilitated by recommending procedures to analyze the software component based on information regarding other evaluations.

The features, functions, and advantages that have been described can be achieved independently in various embodiments or may be combined in other embodiments, further details of which are disclosed with reference to the following description and drawings.

DETAILED DESCRIPTION

Figure 1:
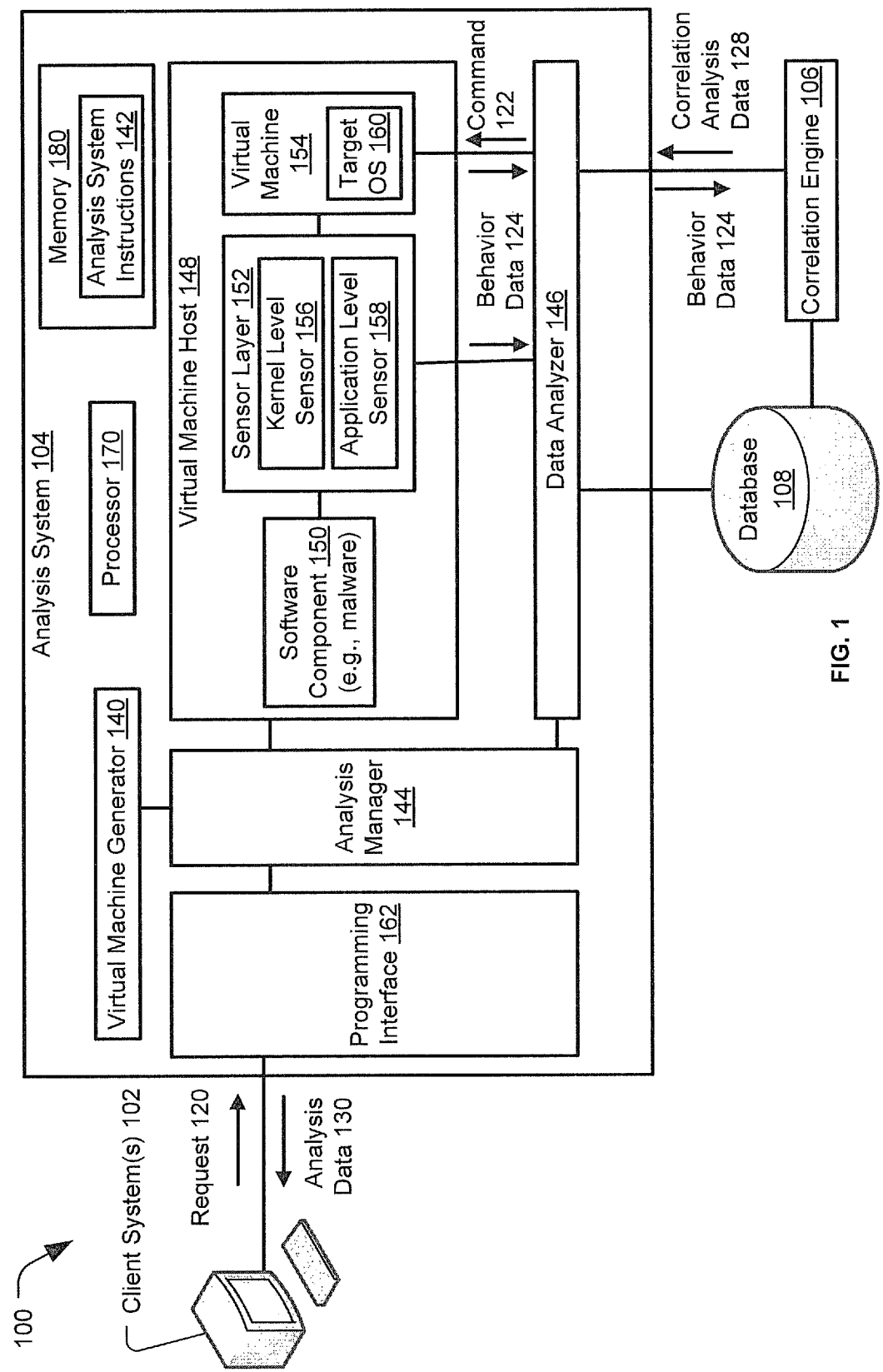
FIG. 1 is a block diagram of a particular embodiment of a system to analyze a software component.

Referring to FIG. 1, a block diagram of a particular embodiment of a system to analyze a software component is disclosed and generally designated 100. The system 100 may include an analysis system 104 coupled to or in communication with one or more client system(s) 102. The analysis system 104 may also include, be coupled to, or be in communication with a correlation engine 106 and a database 108. The analysis system 104 may include a processor 170 and a memory 180. The analysis system 104 may also include an analysis manager 144 coupled to the client system(s) 102 via a programming interface 162 (e.g., an application programming interface (API)). The analysis manager 144 may be coupled to a virtual machine generator 140, to a virtual machine host 148, and to a data analyzer 146. The data analyzer 146 may be coupled to the database 108 and to the correlation engine 106.

The analysis system 104 may include fewer or more components than illustrated in FIG. 1. For example, the analysis system 104 may include more than one processor, may include more than one memory, or both. The analysis system 104 may include a networked or distributed computing system. In a particular illustrative embodiment, the analysis system 104 may include a communications device, a personal digital assistant (PDA), a mobile location data unit, a mobile phone, a cellular phone, a portable computer, a tablet computing device, or a combination thereof. Such devices may include a user interface, e.g., a touch screen, voice recognition capability, or other user interface capabilities.

The memory 180 may store instructions (e.g., analysis system instructions 142). One or more of the functional modules of the analysis system 104 may correspond to the analysis system instructions 142. The analysis system instructions 142 may be executable by the processor 170 to perform various operations. For example, the processor 170 may perform operations including receiving a request (e.g., a request 120) from a client system (e.g., the client system(s) 102) to analyze a software component (e.g., malware). To illustrate, an analyst may send the request 120 from the client system(s) 102 to analyze the software component 150 to the analysis system 104 via a programming interface (e.g., the programming interface 162). The programming interface 162 may forward the request 120 to an analysis manager (e.g., the analysis manager 144). In a particular embodiment, the request 120 may include or identify the software component 150. The analysis manager 144 may generate a digital identifier of the software component 150. The analysis manager 144 may store the software component 150 in the database 108 along with the digital identifier. In a particular embodiment, the digital identifier may be a hash signature of the software component 150. For example, the analysis manager 144 may generate the hash signature using a message-digest algorithm 5 (MD5) algorithm, a secure hash algorithm 1 (SHA-1), a secure hash algorithm 256 (SHA-256), or a ssdeep algorithm.

In response to the request 120, the analysis manager 144 may set up an environment to isolate effects of executing the software component 150 during the analysis. For example, the analysis manager 144 may request a virtual machine generator (e.g., the virtual machine generator 140) to generate a virtual machine (e.g., a virtual machine 154) that implements a target operating system (e.g., a target operating system (OS) 160). The virtual machine generator 140 may generate the virtual machine 154 in a virtual machine host (e.g., the virtual machine host 148). The virtual machine 154 may implement the target operating system 160.

Images of a plurality of operating systems, including the target operating system 160, may be stored in a database (e.g., the database 108). The virtual machine 154 may be generated using a copy of the image of the target operating system 160. The image of the target operating system 160 may be received from or identified by the client system(s) 102. In a particular embodiment, the request 120 may indicate the target operating system 160. For example, the request 120 may include the image of the target operating system 160 or an identifier of the target operating system 160. The virtual machine 154 may be generated to emulate a particular client operating environment indicated in the request 120. For example, the analyst may be interested in analyzing the behavior of the software component 150 in the particular client operating environment without putting the actual client operating environment at risk from harmful effects of executing the software component 150. In a particular embodiment, the target operating system 160 may be a custom operating system derived from an image from a golden master source. In a particular embodiment, the target operating system may include an open source operating system or a proprietary operating system.

The analysis manager 144 may set up a sensor layer (e.g., a sensor layer 152) between the software component 150 and the virtual machine 154 to monitor execution of the software component 150, as further described with reference to FIG. 2. The sensor layer 152 may include sensor functions, such as a kernel level sensor (e.g., a kernel level sensor 156), an application level sensor (e.g., an application level sensor 158), or both. The analysis manager 144 may couple the software component 150 to the sensor layer 152. For example, the analysis manager 144 may inform the software component 150 that a particular dynamic-link library (DLL) is to be used during execution. The particular DLL may correspond to the application level sensor 158. As another example, the analysis manager 144 may install a kernel level software program in a kernel of the target of operating system 160. The kernel level software program may correspond to the kernel level sensor 156.

The analysis manager 144 may initiate execution of the software component 150 in the target operating system 160 on the virtual machine 154. The software component 150 may be coupled to, or communicate with, the virtual machine 154 via the sensor layer 152. The sensor layer 152 may monitor the virtual machine 154. For example, the kernel level sensor 156, the application level sensor 158, or both, may detect function calls, memory modification, file access, network access, registry modification, file system modification, system resource utilization, sub-process creation, or a combination thereof.

For example, when the software component 150 initiates an application level function call (e.g., an application level event) to the target operating system 160, the application level function call may be directed to the application level sensor 158 (e.g., the particular DLL). To illustrate, the application level sensor 158 may detect the application level function call before execution of an application level function associated with the application level function call. The application level sensor 158 may store data (e.g., the behavior data 124) regarding the detected application level function call. The data regarding the application level function call may identify the application level function, one or more arguments of the application level function call, a timestamp indicating when the application level function call is detected, or a combination thereof. The application level sensor 158, the virtual machine 154, or both, may also generate and store data (e.g., the behavior data 124) regarding effects of executing the application level function.

A particular application level event may result in multiple corresponding kernel level events. Each of the corresponding kernel level events may be initiated by the software component 150 in response to the software component 150 initiating the particular application level event. For example, execution of the application level function may result in one or more corresponding kernel level function calls. The sensor layer 152 may store data (e.g., the behavior data 124) identifying the particular application level event and the multiple corresponding kernel level events. In a particular embodiment, the software component 150 may initiate a kernel level event without initiating an intervening application level event.

Each kernel level event (e.g., each kernel level function call) may be detected by the kernel level sensor 156 (e.g., the kernel level software program). For example, the kernel level sensor 156 may detect a kernel level function call before execution of a kernel level function associated with the kernel level function call. The kernel level sensor 156 may store data (e.g., the behavior data 124) regarding the detected kernel level function call. The data regarding the kernel level function call may identify the kernel level function, one or more arguments of the kernel level function call, a timestamp indicating when the kernel level function call is detected, or a combination thereof. The kernel level sensor 156, the virtual machine 154, or both, may also store data (e.g., the behavior data 124) regarding effects of executing the kernel level function.

An effect of executing the software component 150 (e.g., a kernel level event, an application level event, or both) may include modifying a memory location, accessing a file, accessing a network, modifying a registry, modifying a file system, utilizing a system resource, creating a sub-process, effects of executing the sub-process, or a combination thereof. The behavior data 124 may be stored in the database 108 along with the digital identifier of the software component 150.

The data analyzer 146 may analyze the software component 150 in an iterative process. For example, the data analyzer 146 may receive the behavior data 124 and send a command (e.g., a command 122) to modify an operating condition of the target operating system 160. The command 122 may include hiding a file from the software component 150, executing an application or application function, enabling network access by the software component 150, disabling network access by the software component 150, modifying a date of the target operating system 160, modifying a time of the target operating system 160, or a combination thereof. To illustrate, the data analyzer 146 may send the command 122 to the target operating system 160 to advance a clock of the target operating system 160 to analyze effects of executing the software component 150 over a particular time period. Subsequent to sending the command 122, the data analyzer 146 may receive the behavior data 124 indicating results of executing the software component 150 with the modified operating condition of the target operating system 160. In a particular embodiment, the iterative analysis process may be based on an analysis tool used to analyze the software component 150, a recommended procedure to analyze the software component 150, analysis data (e.g., analysis data 130) generated by the data analyzer 146, correlation analysis data (e.g., correlation analysis data 128) received from the correlation engine 106, or a combination thereof.

The analysis manager 144 may send analysis data (e.g., the analysis data 130) to the client system(s) 102. The data analyzer 146 may initiate display of at least a portion of the analysis data 130 at the client system(s) 102 by sending the analysis data 130 to the client system(s) 102. The analysis data 130 may indicate results of analyzing the software component 150. For example, the analysis data 130 may include or correspond to at least a portion of the behavior data 124, one or more recommended procedures to analyze the software component 150, one or more recommended procedures to detect execution of the software component 150 at another computing device, one or more recommended procedures to prevent the effects of executing the software component 150 when the software component 150 is executed at another computing device, at least a portion of the correlation analysis data 128, a report regarding the analysis of the software component 150, or a combination thereof. The data analyzer 146 may store the analysis data 130 in the database 108 along with an identifier of the software component 150.

The data analyzer 146 may send at least a portion of the behavior data 124 to a correlation engine (e.g., the correlation engine 106). The correlation engine 106 may correspond to instructions (e.g., the analysis system instructions 142) executed by a processor (e.g., the processor 170). In a particular embodiment, the portion of the behavior data 124 sent to the correlation engine 106 may be selected by the analyst. For example, the analysis manager 144 may send the analysis data 130 indicating the behavior data 124 to the client system (s) 102. The analyst may choose to focus the correlation analysis on particular aspects of the behavior data 124 and may select the portion of the behavior data 124 to send to the correlation engine 106.

In a particular embodiment, the analyst may also, or in the alternative, select one or more criteria of comparison. For example, the analyst may want to compare the software component 150 with other software components based on one or more criteria of comparison. The criteria of comparison may include an at least partial match of a digital identifier, a date range of detection, an effect of execution, a kernel event, an application event, an author, a source, a location, or a combination thereof.

The client system(s) 102 may send a second request (e.g., the request 120) to the analysis manager 144. The request 120 may indicate the selected portion of the behavior data 124, may indicate the selected one or more criteria of comparison, or a combination thereof. The data analyzer 146 may send (or make accessible) the portion of the behavior data 124, the selected one or more criteria of comparison to the correlation engine 106, or both, to the correlation engine 106.

The correlation engine 106 may compare the portion of the behavior data 124 to information in a database (e.g., the database 108). For example, the correlation engine 106 may compare the behavior data 124 to data corresponding to another software component. In a particular embodiment, the correlation engine 106 may identify the other software component based on the other software component satisfying the one or more criteria of comparison. In a particular embodiment, the correlation engine 106 may identify the other software component based on at least a partial match of an identifier of the other software component and the identifier of the software component 150.

For example, the information in the database 108 may include digital identifiers of other software components that have been analyzed using an analysis system (e.g., the analysis system 104). The digital identifiers may each correspond to a hash signature of a particular software component. The correlation engine 106 may compare the digital identifier of the software component 150 to the digital identifiers of the other software components. The correlation engine 106 may determine that the software component 150 is related to a second software component in response to determining that the digital identifier of the software component 150 is related to (e.g., similar to) the digital identifier of the second software component. To illustrate, the correlation engine 106 may determine that the digital identifier of the software component 150 is related to the digital identifier of the second software component based on at least a partial match of the digital identifier of the software component 150 and the digital identifier of the second software component.

In a particular embodiment, the information in the database 108 may correspond to behavior data, analysis data, or both, from an earlier analysis of the other software component (e.g., the second software component). The information in the database 108 may also include information regarding a detected execution of the other software component (e.g., date, location, etc.). For example, the other software component may have been detected executing at another computing device (e.g., the client system(s) 102) at a particular date. The execution of the other software component may have been detected using procedures recommended by the earlier analysis of the other software component. The other computing device (e.g., the client system(s) 102) may have provided information regarding the detected execution to the database 108. The information regarding the detected execution of the other software component may help the analyst determine how related software components are spreading from one computing device to another, how recently the other software component was detected, or both.

The correlation engine 106 may provide correlation analysis data (e.g., the correlation analysis data 128) to the data analyzer 146 based on the comparison of the portion of the behavior data 124 to information in the database 108. The correlation analysis data 128 may include information regarding the other software component. For example, the correlation analysis data 128 may indicate a digital identifier of the other software component, a timestamp associated with a prior detection of the other software component, a location associated with the prior detection of the other software component, a source associated with the other software component, an author associated with the other software component, analysis data regarding application level events, kernel level events, or both, associated with the other software component, analysis data regarding effects of executing the other software component, or a combination thereof.

The correlation engine 106 may store the correlation analysis data 128 in the database 108 along with the digital identifier of the software component 150. The data analyzer 146 may include the correlation analysis data 128 in the analysis data 130 to send to the client system(s) 102.

The data analyzer 146 may identify similar effects, distinct effects, or both, of executing the software component 150 and the other software component. For example, the data analyzer 146 may compare the behavior data 124 and the correlation analysis data 128 to generate data indicating the similar effect, the distinct effects, or both. The data analyzer 146 may include the generated data in the analysis data 130. In a particular embodiment, the data analyzer 146 may determine whether the other software component has a same effect upon execution as the software component 150 and may generate data regarding the other software component based on the determination. For example, the data analyzer 146 may generate data indicating that the other software component and the software component 150 have a particular effect upon execution in response to determining that the other software component and the software component 150 have the particular effect. The data analyzer 146 may include the generated data regarding the other software component in the analysis data 130.

The data analyzer 146 may determine a particular procedure of analyzing the software component 150 based on the correlation analysis data 128. The particular procedure may include determining whether effects of executing the software component 150 are similar to effects of executing the other software component. The particular procedure may include hiding a file from the software component 150, enabling network access by the software component 150, disabling network access by the software component 150, modifying a date of the target operating system 160, modifying a time of the target operating system 160, determining whether a particular kernel level event occurs during execution of the software component 150, whether a particular application level event occurs during execution of the software component 150, using a particular analysis tool to analyze the software component 150, executing the software component 150 in a particular operating system (e.g., the target operating system 160), executing the software component 150 in a particular operating environment (e.g., with the particular operating system, a particular set of applications, a particular set of values of system variables, a particular memory configuration, a particular network configuration, etc.), or a combination thereof.

For example, the correlation analysis data 128 may indicate that executing the other software component had a particular effect in response to particular operating conditions. In this example, the particular procedure may include creating the particular operating conditions to determine whether execution of the software component 150 results in the particular effects. To illustrate, the correlation analysis data 128 may indicate that the other software component attempted to access a particular network after a particular time period (e.g., 1 week) of execution of the other software component. The particular procedure may include identifying whether the effects of executing the software component 150 and the other software component are similar by comparing the behavior data 124 to the analysis data regarding the effects of executing the other software component. For example, the particular procedure may include simulating the particular operating conditions, e.g., by advancing a clock of the virtual machine 154 to simulate elapse of the particular time period. As another example, the particular procedure may include determining whether the behavior data 124 indicates that the software component 150 attempted to access the particular network after the particular time period of execution.

As another example, the correlation analysis data 128 may indicate that a particular analysis tool was used to analyze the other software component. Using the same analysis tool to analyze the software component 150 may facilitate comparing the results of analyzing the software component 150 and the other software component. In this example, the particular procedure may include using the particular analysis tool to analyze the software component 150.

As an additional example, the correlation analysis data 128 may indicate that using the particular analysis tool to analyze the other software component is recommended (e.g., by an analyst). An analysis tool that is recommended to analyze a related software component may be useful in analyzing the software component 150. In this example, the particular procedure may include using the particular analysis tool to analyze the software component 150. In a particular embodiment, the data analyzer 146 may perform the particular procedure in response to receiving the correlation analysis data 128.

In a particular embodiment, the data analyzer 146 may recommend the particular procedure by indicating the recommended procedure in the analysis data 130. The data analyzer 146 may initiate display of a plurality of analysis options, including the recommended procedure, at the client system(s) 102 by sending the analysis data 130 to the client system(s) 102. The analyst may select one or more of the plurality of analysis options (e.g., the recommended procedure) to analyze the software component 150. The client system(s) 102 may send a request (e.g., the request 120) indicating the one or more selected analysis options (e.g., the recommended procedure). In this embodiment, the data analyzer 146 may perform the one or more selected analysis options (e.g., the recommended procedure) in response to the request 120. For example, the data analyzer 146 may send a command (e.g., the command 122) to advance the clock of the target operating system 160. The data analyzer 146 may receive data (e.g., the behavior data 124) indicating results of using the recommended procedure to analyze the software component 150. The data analyzer 146 may store the behavior data 124 in the database 108 along with the digital identifier of the software component 150. The data analyzer 146 may include the behavior data 124 in the analysis data 130 and may send the analysis data 130 to the client system(s) 102.

In a particular embodiment, the request 120 may indicate a particular analysis tool (e.g., a behavioral analysis tool, a static analysis tool, or both). For example, the analyst may select the particular analysis tool to analyze the software component 150. The data analyzer 146 may send the command 122 based on a particular command indicated by the particular analysis tool (e.g., the behavioral analysis tool). As another example, the data analyzer 146 may select a portion of the behavior data 124 to include in the analysis data 130 based on the particular analysis tool (e.g., the behavioral analysis tool). As another example, the data analyzer 146 may perform a static analysis of the software component 150 based on the particular analysis tool (e.g., the static analysis tool). In a particular embodiment, the data analyzer 146 may perform the static analysis prior to, during, or subsequent to execution of the software component 150, or a combination thereof.

In a particular embodiment, the request 120 may indicate a particular reporting format (e.g., a standardized reporting language). For example, the analyst may select a particular reporting format for generating a report. The data analyzer 146 may generate the report in the particular reporting format (e.g., based on the behavioral data 124, a static analysis of the software component 150, or both). The data analyzer 146 may store the report in the database 108 along with an identifier of the software component 150. The analysis manager 144 may include the report in the analysis data 130 sent to the client system(s) 102.

The data analyzer 146 may determine a procedure to detect execution of the software component 150 at a second computing device (e.g., the client system(s) 102). The procedure to detect execution of the software component 150 may be determined based on the effects of executing the software component 150. For example, the behavior data 124 may indicate a particular set of effects of executing the software component 150. To illustrate, the behavior data 124 may indicate that an effect of executing the software component 150 includes making particular changes to a particular memory location. Based on the behavior data 124, the procedure to detect execution of the software component 150 may include determining whether a corresponding memory location of the second computing device includes the particular changes. In a particular embodiment, the data analyzer 146 may recommend the procedure to detect execution of the software component 150 by indicating the recommended procedure in the analysis data 130.

The data analyzer 146 may determine a procedure to prevent one or more effects of executing the software component 150 when the software component 150 is executed on a second computing device. For example, the behavior data 124 may indicate that an effect of executing the software component 150 includes accessing a particular network location. Based on the behavior data 124, the procedure to prevent one or more effects of executing the software component 150 may include disabling access to the particular network location. In a particular embodiment, the data analyzer 146 may recommend the procedure to prevent one or more effects of executing the software component 150 by indicating the recommended procedure in the analysis data 130.

When analysis of the software component 150 is complete, the analysis manager 144 may initiate removal of the virtual machine 154. For example, the analysis manager 144 may request the virtual machine host 148 to remove the virtual machine 154 in response to a request (e.g., the request 120) from the client system(s) 102. To illustrate, the analyst may send the request 120 to indicate that monitoring execution of the software component 150 may be stopped, that the virtual machine 154 may be removed, or both. The virtual machine host 148 may remove the virtual machine 154. Operation of the system 100 is further described with reference to FIGS. 2-13.

The system 100 may enable analysis of a software component. The behavior of the software component may be analyzed in an operating environment that emulates a client operating environment. Collaborative evaluation of the software component may be facilitated by comparing behavior data of the software component to information regarding other software components during analysis of the software component.

Figure 2:
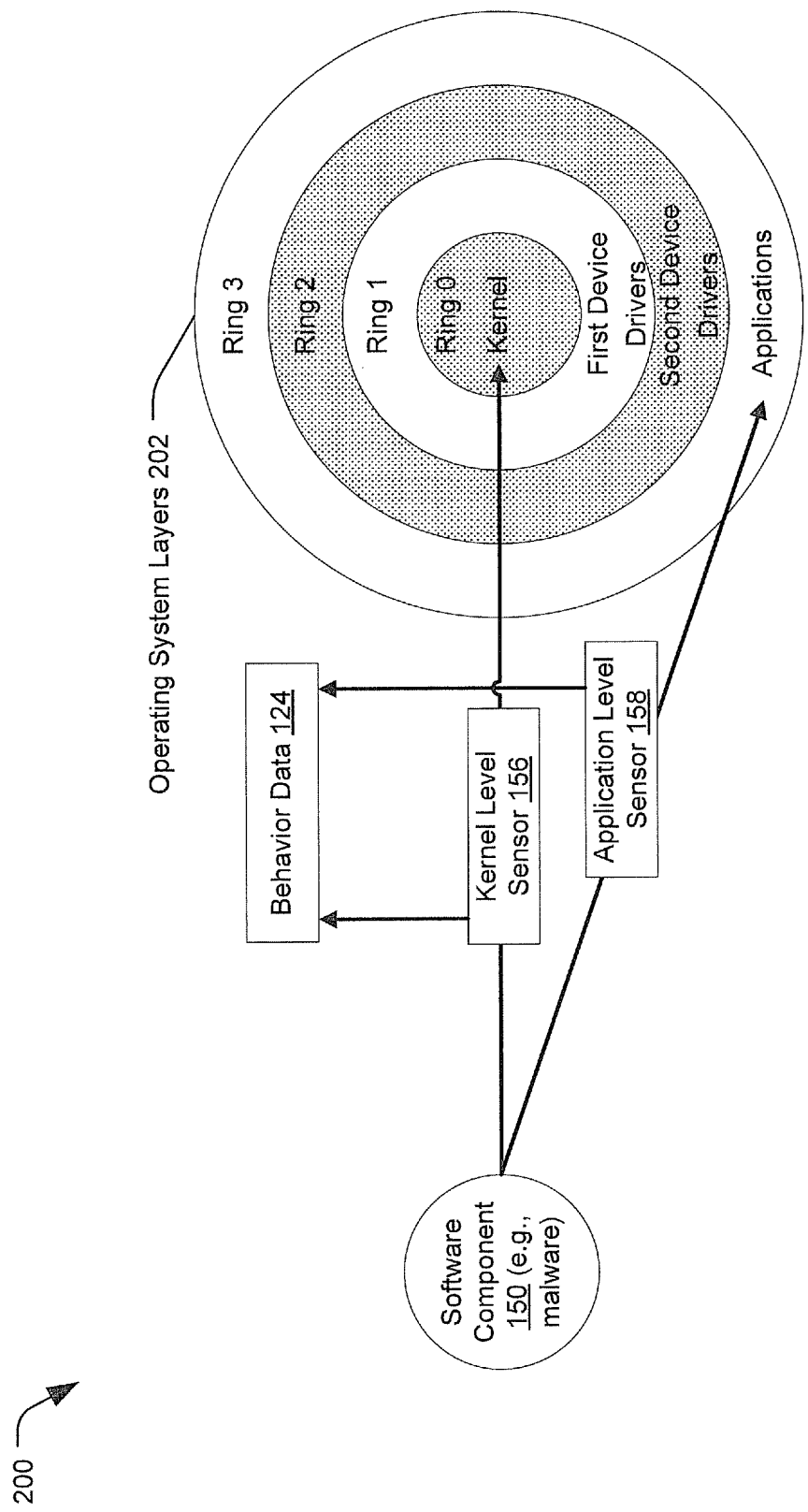
FIG. 2 is a diagram illustrating monitoring behavior that may be implemented by the system of FIG. 1.

Referring to FIG. 2, a diagram illustrating monitoring behavior that may be implemented by the system 100 of FIG. 1 is shown and is generally designated 200. FIG. 2 illustrates operating system layers 202 that may correspond to protection rings of an operating system (e.g., the target operating system 160 of FIG. 1). The protection rings may be arranged in a hierarchy from most privileged (e.g., Ring 0) to least privileged (e.g., Ring 3). Ring 0 may be the level that interacts most directly with physical hardware (e.g., the processor 170, the memory 180, or both, of FIG. 1). A kernel may run in Ring 0 of the target operating system 160, whereas applications may run in Ring 3 of the target operating system 160. Device drivers (e.g., first device drivers and second device drivers) may run in Rings 1 and 2 of the target operating system 160.

FIG. 2 illustrates that the application level sensor 158 may monitor application level events initiated by the software component 150 and that the kernel level sensor 156 may monitor kernel level events initiated by the software component, as further described with reference to FIG. 1. In a particular embodiment, the application level sensor 158 may run in an operating system layer corresponding to Ring 3 of the target operating system 160, and the kernel level sensor 156 may run in an operating system layer corresponding to Ring 0 of the target operating system 160. The kernel level sensor 156, the application level sensor 158, or both, may generate the behavior data 124 regarding events (e.g., the kernel level events, the application level events, or both) initiated by the software component 150, as further described with reference to FIG. 1.

The kernel level sensor 156 running in Ring 0 may be more difficult to detect, and hence more difficult to circumvent, by the software component 150 than the application level sensor 158 running in Ring 3 of the target operating system 160. The application level sensor 158 may provide data that is easier for the analyst to understand than the data provided by the kernel level sensor 156. Using both the kernel level sensor 156 and the application level sensor 158 may result in a robust and efficient software component analysis system.

Figure 3:
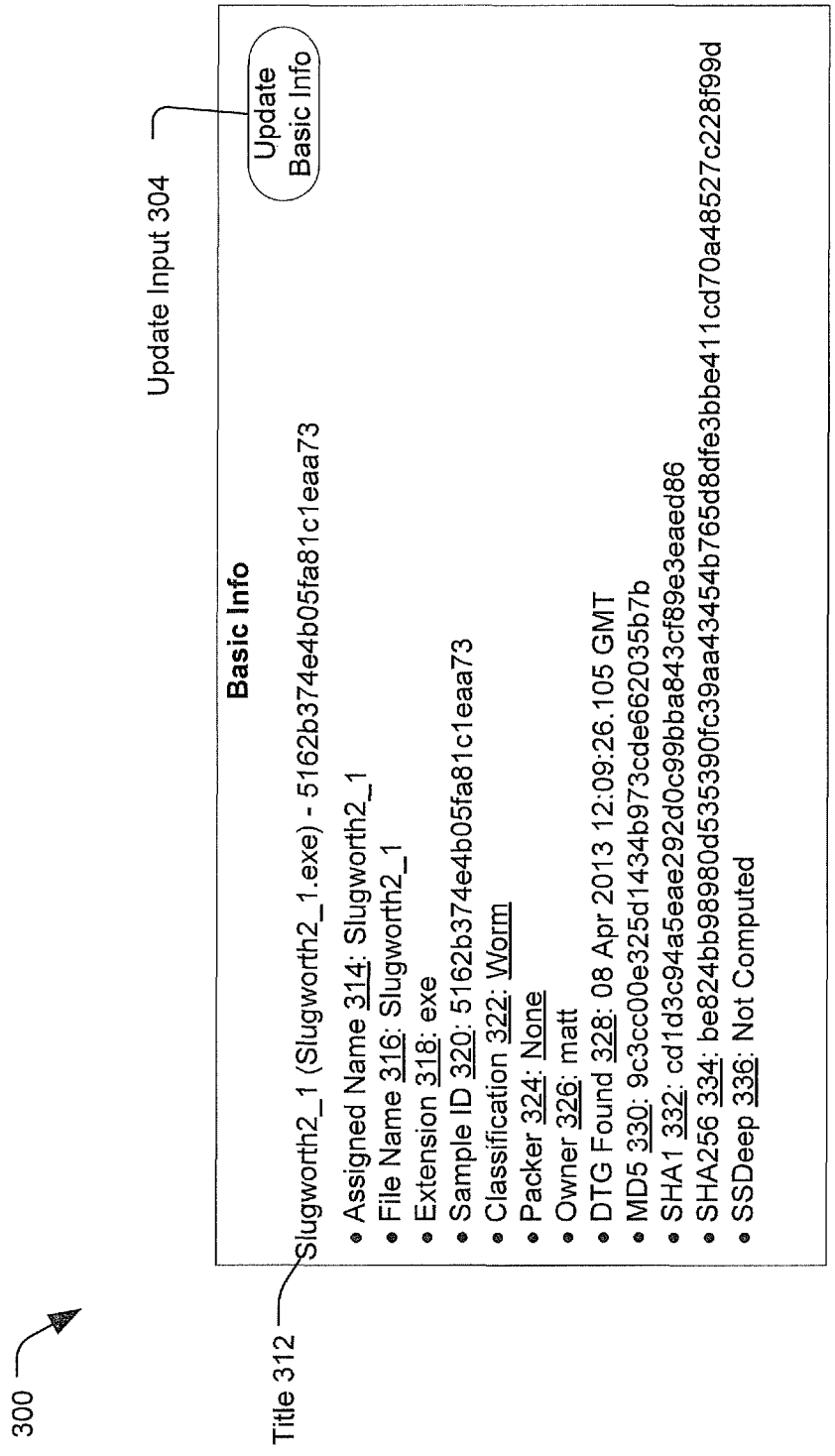
FIG. 3 is a diagram of a particular embodiment of a basic information user interface that may be displayed by the system of FIG. 1.

Referring to FIG. 3, a diagram of a particular embodiment of a basic information user interface that may be displayed by the system of FIG. 1 is shown and is generally designated 300. The basic information user interface 300 may include information regarding a software component (e.g., the software component 150 of FIG. 1). For example, the basic information user interface 300 may include or identify a title 312, an assigned name 314, a file name 316, an extension 318, a sample identifier 320, a classification 322, a packer 324, an owner 326, a date-time group (DTG) found 328, a message-digest algorithm 5 (MD5) value 330, a secure hash algorithm 1 (SHA-1) value 332, a secure hash algorithm 256 (SHA-256) value 334, and a ssdeep algorithm value 336. The basic information user interface 300 may also include an update input 304.

During operation, the analyst may send a request (e.g., the request 120) to the analysis manager 144 via the programming interface 162. In response to the request 120, the analysis manager 144 may initiate display of the basic information user interface 300. For example, the request 120 may indicate a software component (e.g., the software component 150). In response to the request 120, the analysis manager 144 may send data regarding the software component 150 to the client system(s) 102. The client system(s) 102 may display the basic information user interface 300 based on the data regarding the software component 150. In a particular embodiment, the values (312-336) may be editable. The analyst may edit one or more of the values (312-336) and select the update input 304 to save the edited values in a database (e.g., the database 108. In a particular embodiment, the sample identifier 320 may uniquely identify the software component 150. The message-digest algorithm 5 (MD5) value 330, the secure hash algorithm 1 (SHA-1) value 332, the secure hash algorithm 256 (SHA-256) value 334, and the ssdeep algorithm value 336 may each correspond to a hash or other identifier that may be compared to a corresponding value of other software components to determine whether the software component 150 matches or is similar to one or more of the other software components.

Thus, the basic information user interface 300 may enable an analyst to verify and update information regarding a software component.

Figure 4:
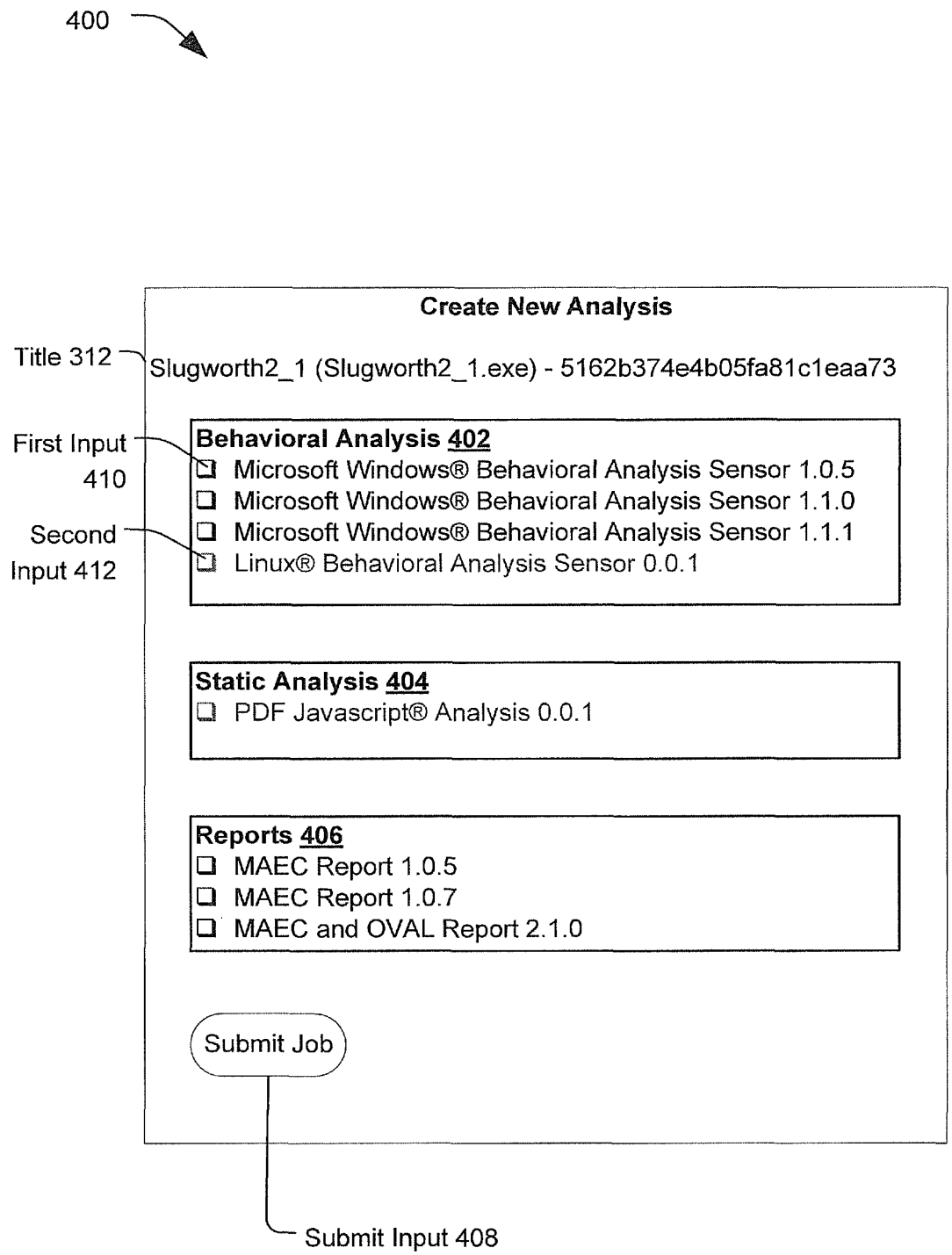
FIG. 4 is a diagram of a particular embodiment of an analysis creation user interface that may be displayed by the system of FIG. 1.

Referring to FIG. 4, a diagram of a particular embodiment of an analysis creation user interface that may be displayed by the system of FIG. 1 is shown and is generally designated 400. In the embodiment illustrated in FIG. 4, the analysis creation user interface 400 may include a title identifying a software component (e.g., the software component 150), may include one or more analysis options to indicate tools to analyze the software component, may include one or more reports options to indicate report formats for results of the analysis, and may include a submit input for submitting one or more selections of the options. The analysis creation user interface 400 includes the title 312 of FIG. 3, behavioral analysis options 402, static analysis options 404, reports options 406, and a submit input 408. The options 402-406 may include one or more inputs. Each input may be associated with a particular analysis tool or a particular report format. An input associated with an unavailable analysis tool or an unavailable report format may not be selectable. An input that is not selectable may be displayed in a different font than a selectable input. An input associated with a recommended analysis tool or a recommended report format may be highlighted. An input that is highlighted may be displayed in a different font than other inputs, may be displayed with a particular symbol (e.g., '*'), may be preselected, or a combination thereof.

For example, the behavioral analysis options 402 includes a plurality of inputs (e.g., the first input 410 and the second input 412), each input may be associated with a particular behavioral analysis tool. The first input 410 and the second input 412 may be displayed in different fonts, colors, or other distinct display formats. To illustrate, the first input 410 may be displayed with a black font color indicating that the first input 410 is selectable, and the second input 412 may be displayed with a grey font color indicating that the second input 412 is not selectable. As another example, the static analysis options 404 includes an input that may be associated with a particular static analysis tool. As another example, the reports options 406 includes a plurality of inputs, each of the inputs may be associated with a particular report format (e.g., a standardized report format).

During operation, the analyst may send a request (e.g., the request 120) to the analysis manager 144 via the programming interface 162. In response to the request 120, the analysis manager 144 may initiate display of the analysis creation user interface 400. For example, the request 120 may identify or include a software component (e.g., the software component 150). In response to the request 120, the analysis manager 144 may send data associated with the analysis creation user interface 400 to the client system(s) 102. The analysis manager 144 may recommend selections within the analysis creation user interface 400. The client system(s) 102 may display the analysis creation user interface 400. The analyst may select one or more inputs of the options 402-406 and may select the submit input 408. The client system(s) 102 may send data indicating the selection of the one or more inputs to the analysis manager 144. The analysis manager 144 may analyze the software component 150 based on the one or more analysis tools, reporting formats, or both, corresponding to the one or more inputs, as further described with reference to FIG. 1.

Thus, the analysis creation user interface 400 may enable the analyst to specify particular analysis tools to be used to analyze the software component. The analyst may also specify particular standardized reporting formats for the results of the analysis. The analysis creation user interface 400 may allow changes of the system 100 to be easily conveyed to the analyst. For example, when a new analysis tool is added to the system 100, the analyst may see an input related to the new analysis tool in the analysis creation user interface 400 and may select the new analysis tool in the usual manner. The analysis creation user interface 400 may also allow the analysis manager 144 to recommend analysis procedures.

Figure 5:
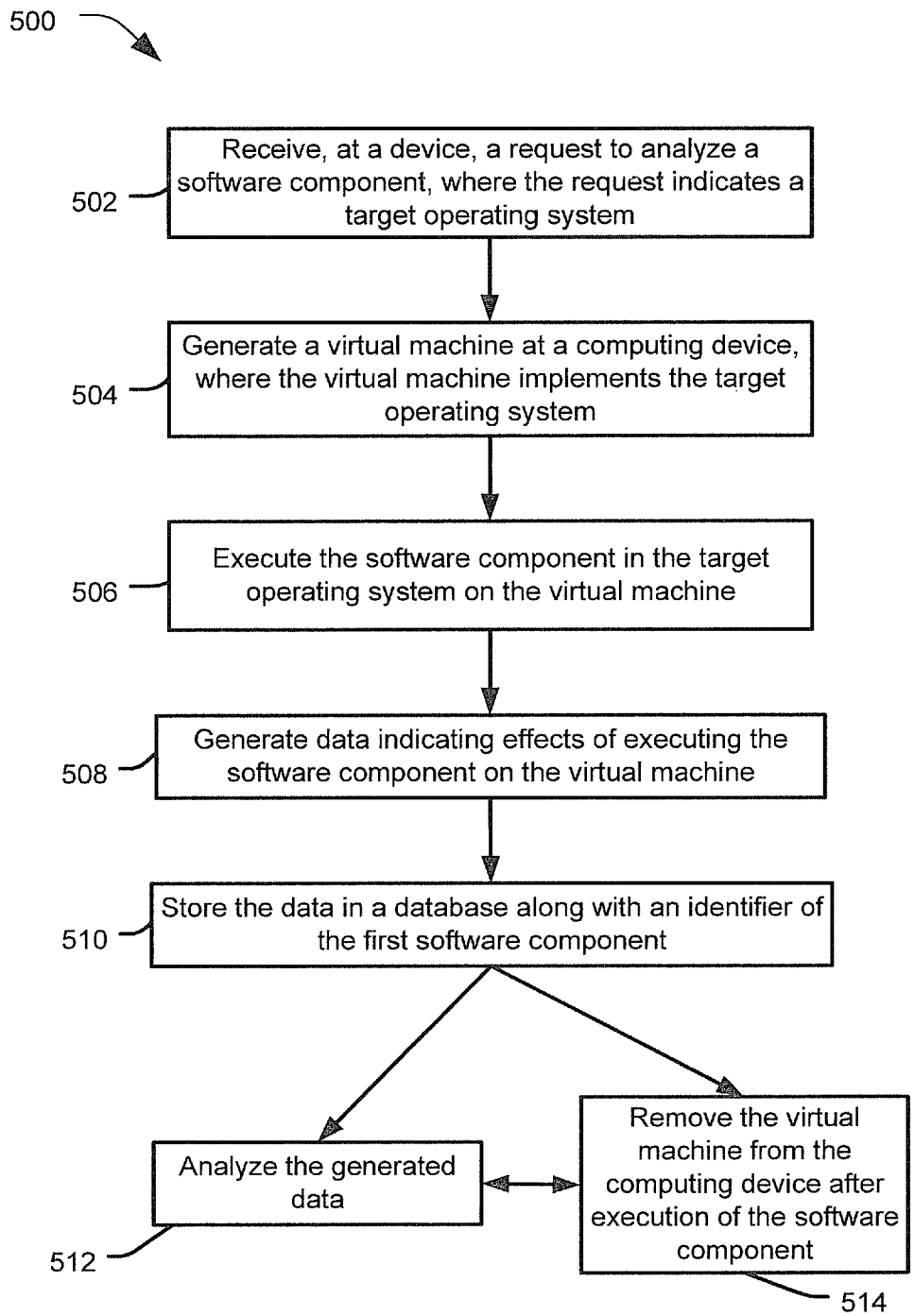
FIG. 5 is a flow chart illustrating a particular embodiment of a method of analyzing a software component.

Referring to FIG. 5, a flow chart of a particular illustrative embodiment of a method of analyzing a software component is shown and is generally designated 500. The method 500 may be executed by the system 100 of FIG. 1.

The method 500 may include receiving, at a device, a request to analyze a software component, at 502. The request may indicate a target operating system. For example, the analysis manager 144 of FIG. 1 may receive the request 120 to analyze the software component 150. The request 120 may indicate the target operating system 160.

The method 500 may also include generating a virtual machine at a computing device, at 504. The virtual machine may implement the target operating system. For example, the virtual machine generator 140 of FIG. 1 may generate the virtual machine 154. The virtual machine generator 140 may generate the virtual machine 154 in response to the analysis manager 144 receiving the request 120, as further described with reference to FIG. 1. The virtual machine 154 may implement the target operating system 160. For example, the virtual machine 154 may load an instance of an image corresponding to the target operating system 160.

The method 500 may further include executing the software component in the target operating system on the virtual machine, at 506. For example, the analysis manager 144 may initiate execution of the software component 150 in the target operating system 160 on the virtual machine 154, as further described with reference to FIG. 1.

The method 500 may also include generating data indicating effects of executing the software component on the virtual machine, at 508. For example, the sensor layer 152, the virtual machine 154, or both, of FIG. 1 may generate the behavior data 124 indicating the effects of executing the software component 150 on the virtual machine 154, as further described with reference to FIG. 1.

The method 500 may further include storing the data in a database along with an identifier of the first software component, at 510. For example, the sensor layer 152, the virtual machine 154, or both, of FIG. 1 may store the behavior data 124 in the database 108 along with an identifier of the software component 150.

The method 500 may also include analyzing the generated data, at 512. For example, the data analyzer 146 may analyze the behavior data 124, as further described with reference to FIG. 1.

Alternatively or in addition, the method 500 may include removing the virtual machine from the computing device after execution of the software component, at 514. For example, the analysis manager 144 may initiate removal of the virtual machine 154 from the analysis system 104 after execution of the software component 150, as further described with reference to FIG. 1.

Thus, the method 500 may be used to analyze a software component. For example, the software component may be executed in a requested operating system on a virtual machine and the effects of executing the software component may be analyzed. The method 500 may allow easy set-up of a test environment and may facilitate collaboration and sharing of results.

Figure 6:
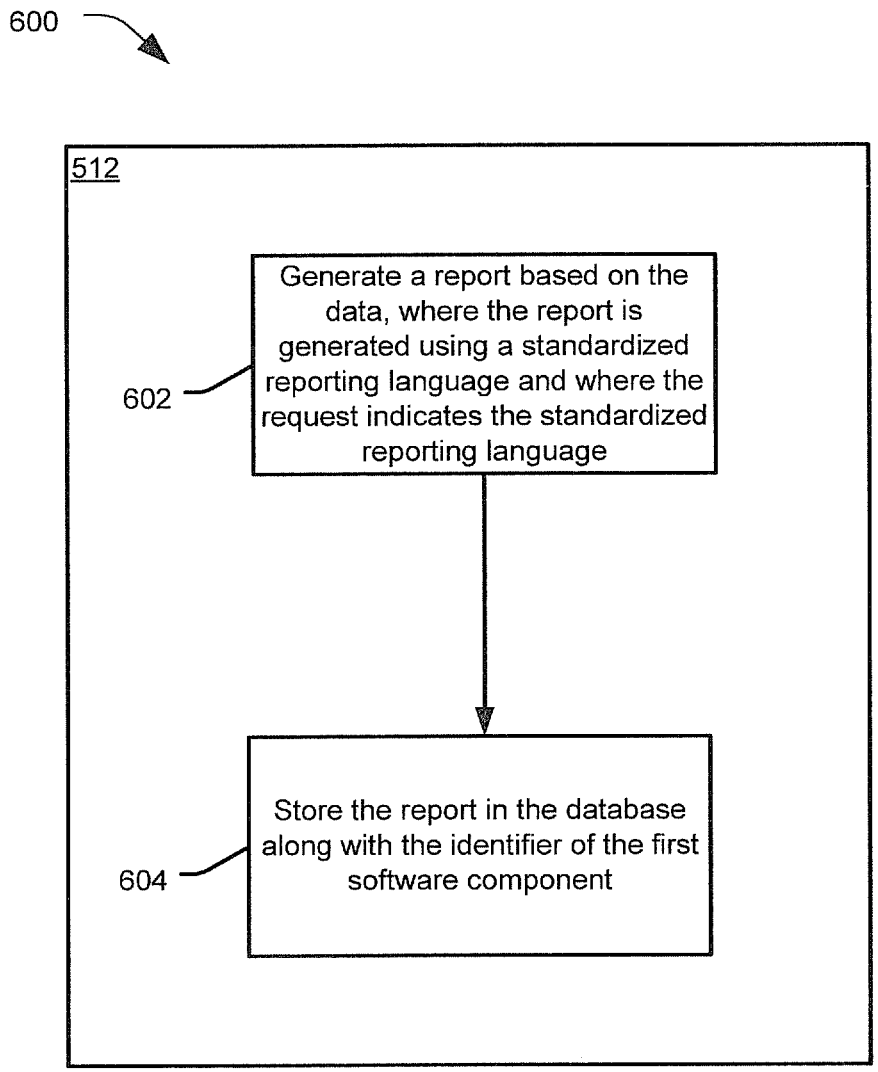
FIG. 6 is a flow chart illustrating a particular embodiment of another method of analyzing a software component and may correspond to operation 512 of FIG. 5.

Referring to FIG. 6, a flow chart of a particular illustrative embodiment of a method of analyzing a software component is shown and is generally designated 600. In a particular embodiment, the method 600 may correspond to operation 512 of FIG. 5.

The method 600 may include generating a report based on the data, at 602. The report may be generated using a standardized reporting language. The request may indicate the standardized reporting language. For example, the data analyzer 146 of FIG. 1 may generate a report based on the behavior data 124. The report may be generated using a requested standardized reporting language, as further described with reference to FIGS. 1 and 4.

The method 600 may also include storing the report in the database along with the identifier of the first software component, at 604. For example, the data analyzer 146 of FIG. 1 may store the report in the database 108 along with the identifier of the software component 150.

Thus, the method 600 may enable generating a report regarding the analysis of the software component in a standardized reporting language. Sharing of data may be simplified by using the standardized reporting language.

Figure 7:
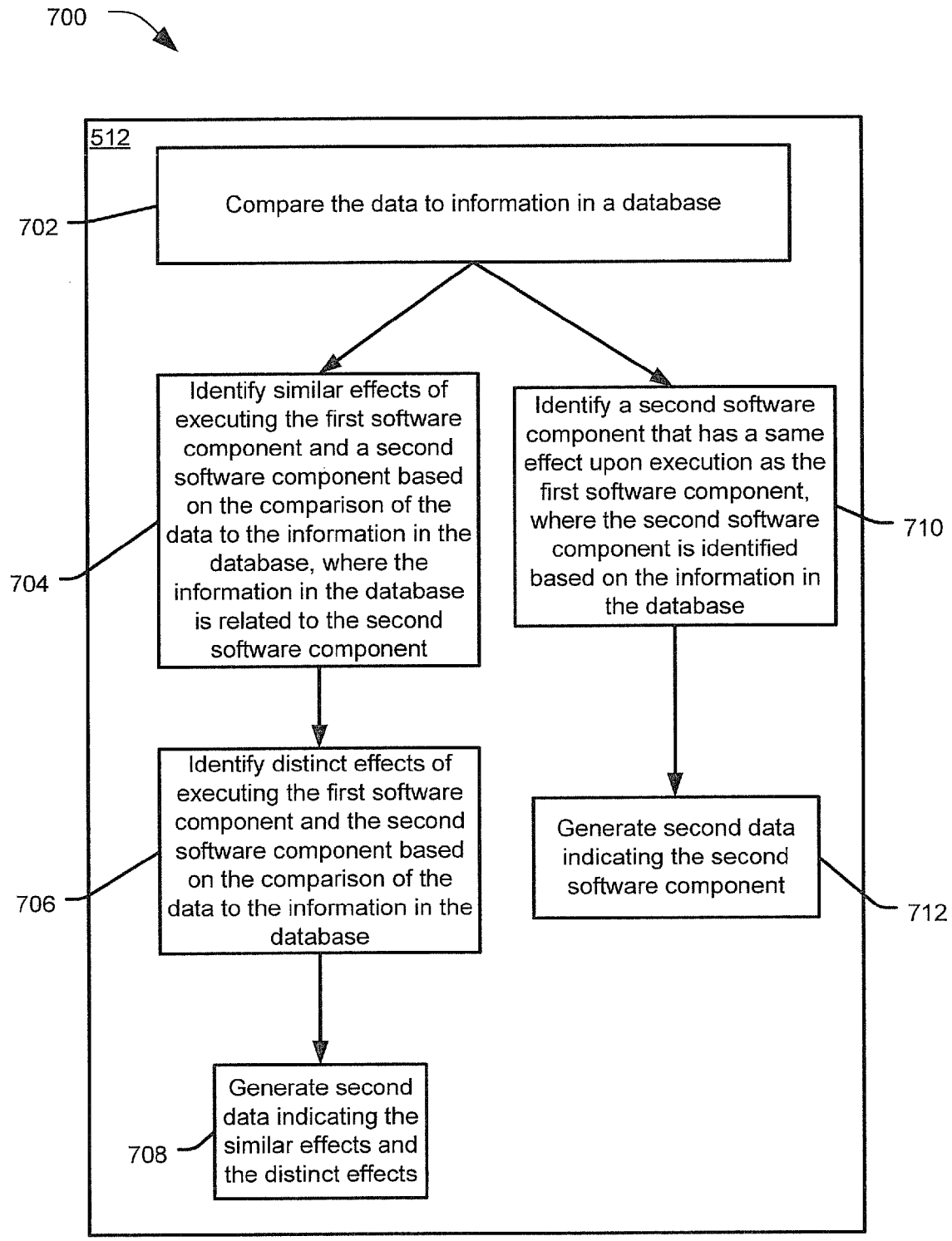
FIG. 7 is a flow chart illustrating a particular embodiment of another method of analyzing a software component and may correspond to operation 512 of FIG. 5.

Referring to FIG. 7, a flow chart of a particular illustrative embodiment of a method of analyzing a software component is shown and is generally designated 700. In a particular embodiment, the method 700 may correspond to operation 512 of FIG. 5.

The method 700 may include comparing the data to information in a database, at 702. For example, the data analyzer 146 of FIG. 1 may compare the behavior data 124 to information (e.g., the correlation analysis data 128) from the database 108, as further described with reference to FIG. 1.

The method 700 may also include identifying similar effects of executing the first software component and a second software component based on the comparison of the data to the information in the database, at 704, identifying distinct effects of executing the first software component and the second software component based on the comparison of the data to the information in the database, at 706, and generating second data indicating the similar effects and the distinct effects, at 708. The information in the database may be related to the second software component. For example, the correlation engine 106 of FIG. 1 may send (or make accessible) information from a database (e.g., the database 108) to the data analyzer 146. The information may be related to the second software component. The data analyzer 146 may identify similar effects, distinct effects, or both, of executing the software component 150 and the second software component based on the comparison of the behavior data 124 to the correlation analysis data 128. The data analyzer 146 may generate data indicating the similar effects and the distinct effects.

The method 700 may further include identifying a second software component that has a same effect upon execution as the first software component, where the second software component is identified based on the information in the database, at 710, and generating second data indicating the second software component, at 712. For example, the data analyzer 146 may determine that the correlation analysis data 128 indicates that a second software component has the same effect (or a similar effect) upon execution as the software component 150. The data analyzer 146 may generate data identifying the second software component. For example, the software component 150 may have a particular effect upon execution, and the analyst may be interested in identifying other software components that have the same particular effect upon execution.

Thus, the method 700 may enable comparing a software component with another software component. For example, the method 700 may identify similar and distinct effects of executing the compared software components. As another example, the method 700 may identify other software components that have a same effect upon execution as the software component.

Figure 8:
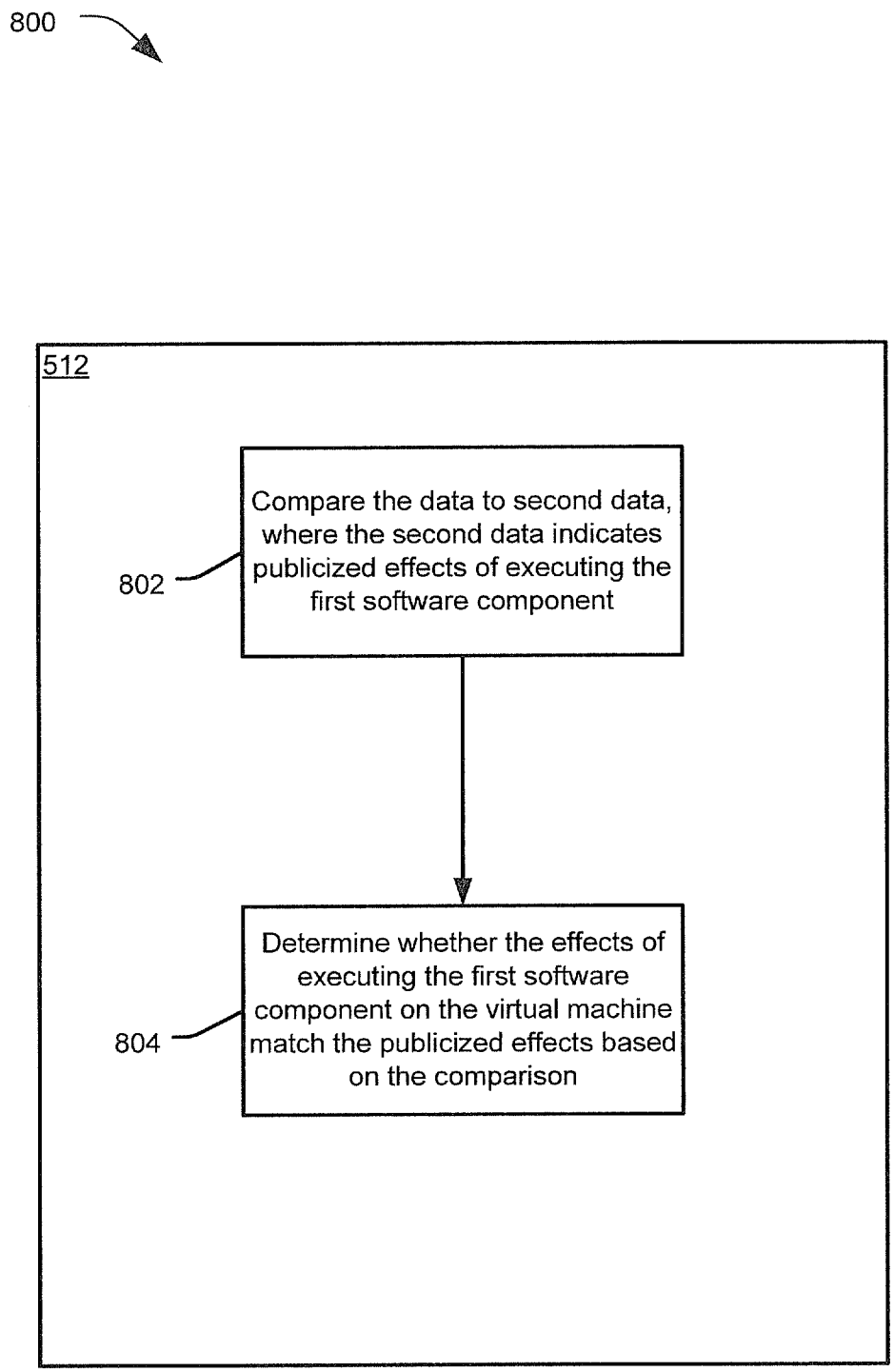
FIG. 8 a flow chart illustrating a particular embodiment of another method of analyzing a software component and may correspond to operation 512 of FIG. 5.

Referring to FIG. 8, a flow chart of a particular illustrative embodiment of a method of analyzing a software component is shown and is generally designated 800. In a particular embodiment, the method 800 may correspond to operation 512 of FIG. 5.

The method 800 may include comparing the data to second data, at 802. The second data indicates publicized effects of executing the first software component. For example, the data analyzer 146 of FIG. 1 may compare the behavior data 124 to data indicating publicized effects of executing the software component 150. In a particular embodiment, the data indicating publicized effects may be received from the client system(s) 102. For example, the request 120 may include the data indicating the publicized effects. To illustrate, the publicized effects may be indicated by a source that provided the software component 150 to the client system(s) 102. In a particular embodiment, the data indicating the publicized effects may be stored in the database 108. For example, the data analyzer 146 may store the data indicating the publicized effects in the database 108 along with an identifier of the software component 150. In a particular embodiment, the publicized effects may include results of a prior analysis by the analysis system 104. For example, the publicized effects may include results of a prior analysis of the software component 150, a prior version of the software component 150, or a version of the software component 150 received by the analysis system 104 from sources other than the client system(s) 102.

The method 800 may also include determining whether the effects of executing the first software component on the virtual machine match the publicized effects based on the comparison, at 804. For example, the data analyzer 146 of FIG. 1 may determine whether the effects of executing the software component 150 indicated by the behavior data 124 match the publicized effects. The data analyzer 146 may generate data indicating whether the effects of executing the software component 150 match the publicized effects. The data analyzer 146 may store the generated data in the database 108. The data analyzer 146 may include the generated data in the analysis data 130.

Thus, the method 800 may enable determining whether effects of executing a software component match publicized effects of executing the software component. The effects of executing the software component may be different from the publicized effects because the publicized effects are associated with another version of the software component or a different operating environment, or because the publicized effects are incorrect. The method 800 may enable the analyst to determine the differences between the effects of executing the software component and the publicized effects.

Figure 9:
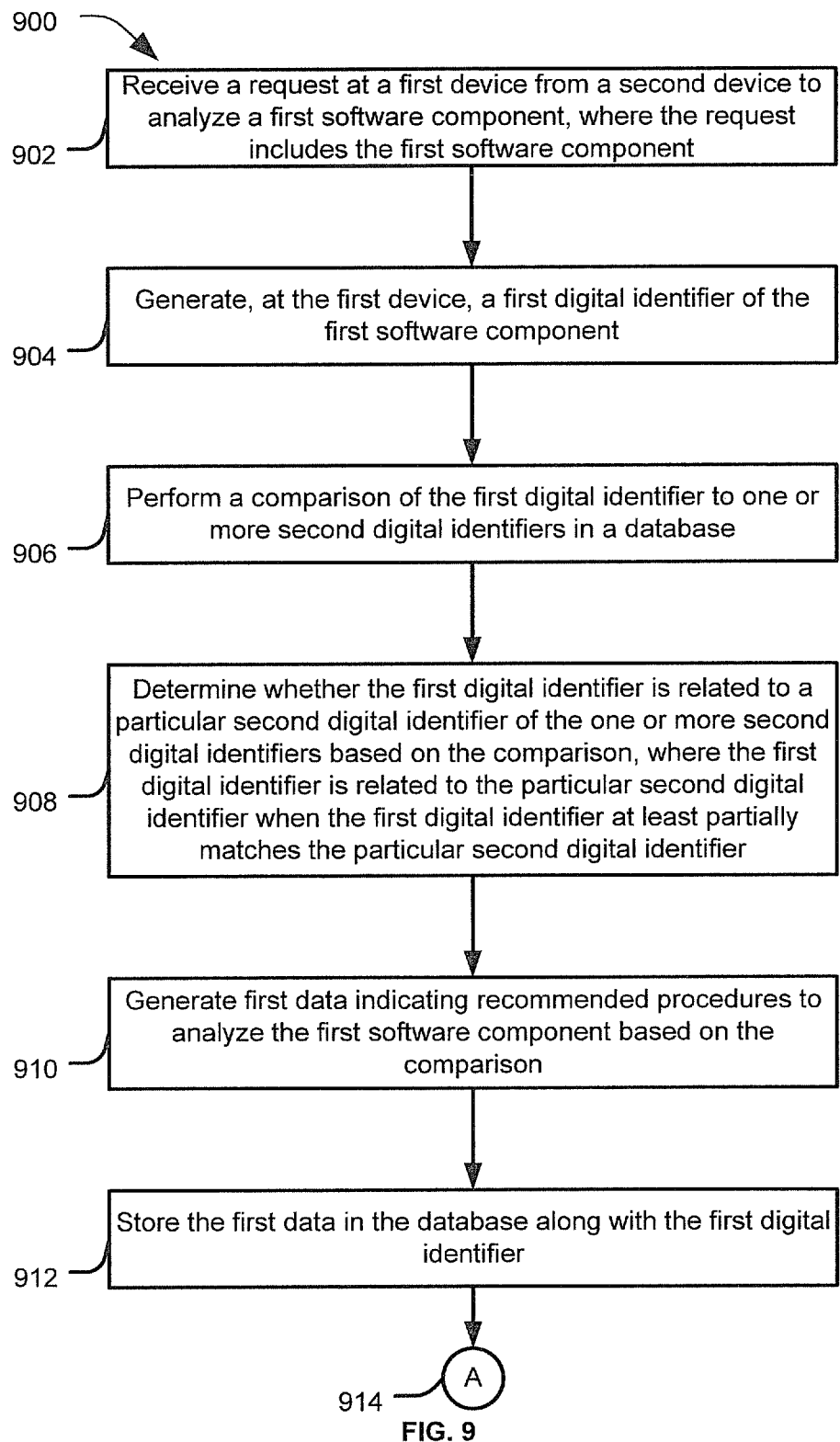
FIGS. 9 and 10 are a flow chart illustrating a particular embodiment of another method of analyzing a software component.
Figure 10:
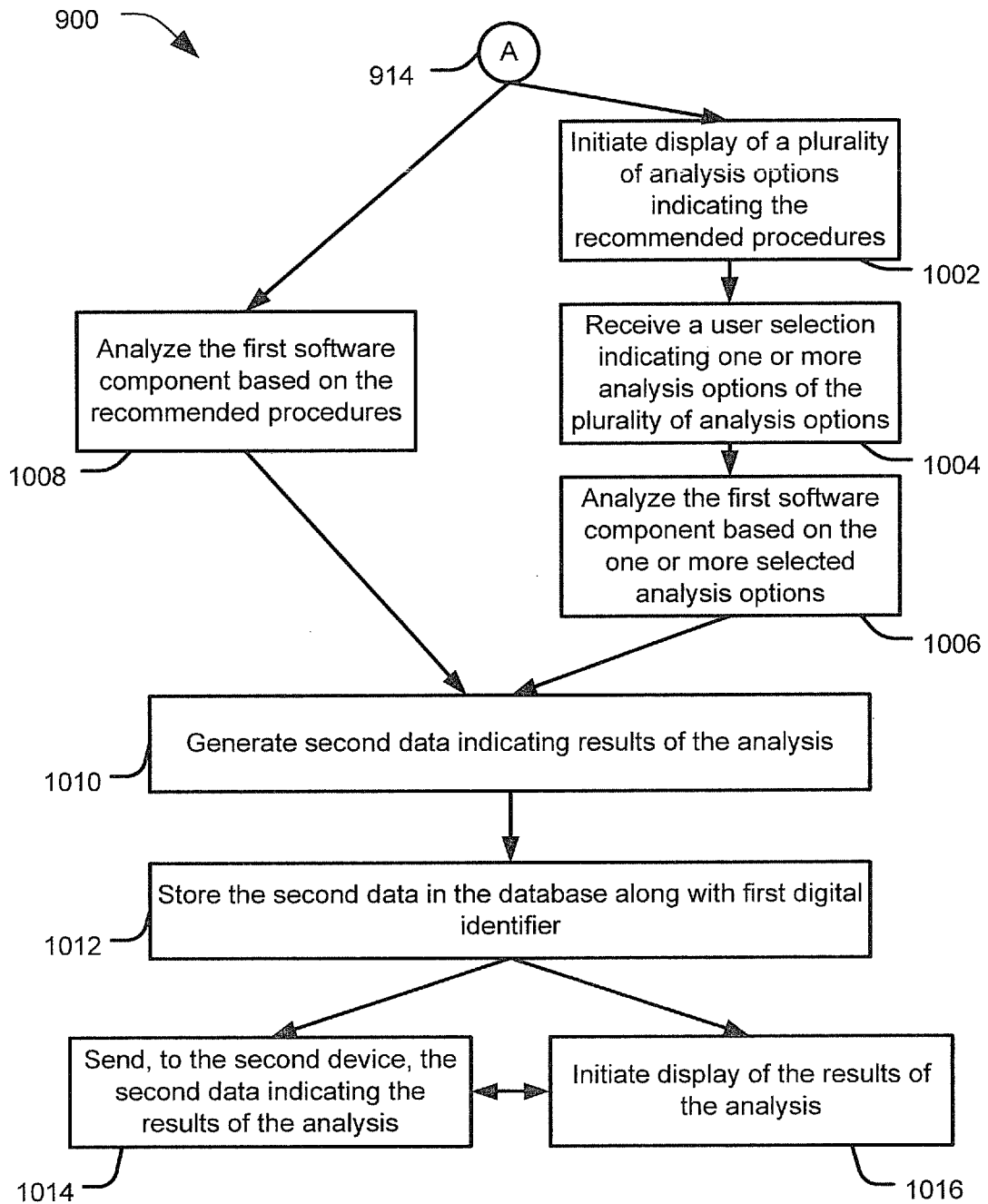

Referring to FIGS. 9 and 10, a flow chart of a particular illustrative embodiment of a method of analyzing a software component is shown and is generally designated 900. The method 900 may be executed by the system 100 of FIG. 1.

The method 900 may include receiving a request at a first device from a second device to analyze a first software component, at 902. The request may include or identify the first software component. For example, the analysis manager 144 of FIG. 1 may receive the request 120 to analyze the software component 150, as further described with reference to FIG. 1.

The method 900 may also include generating, at the first device, a first digital identifier of the first software component, at 904. For example, the analysis manager 144 of FIG. 1 may generate a digital identifier of the software component 150, as further described with reference to FIG. 1. For example, the digital identifier of the software component 150 may be a hash signature. To illustrate, the analysis manager 144 may generate the hash signature using a message-digest algorithm 5 (MD5) algorithm, a secure hash algorithm 1 (SHA-1), a secure hash algorithm 256 (SHA-256), or a ssdeep algorithm.

The method 900 may further include performing a comparison of the first digital identifier to one or more second digital identifiers in a database, at 906. For example, the correlation engine 106 of FIG. 1 may compare the digital identifier of the software component 150 to one or more second digital identifiers in the database 108, as further described with reference to FIG. 1.

The method 900 may also include determining whether the first digital identifier is related to a particular second digital identifier of the one or more second digital identifiers based on the comparison, at 908. The first digital identifier may be related to the particular second digital identifier when the first digital identifier at least partially matches the particular second digital identifier. For example, the correlation engine 106 of FIG. 1 may determine that the digital identifier of the software component 150 is related to a particular digital identifier of the one or more second digital identifiers based on determining that the digital identifier of the software component at least partially matches the particular digital identifier.

The method 900 may further include generating first data indicating recommended procedures to analyze the first software component based on the comparison, at 910. For example, the data analyzer 146 of FIG. 1 may generate data indicating recommended procedures to analyze the software component 150 based on determining that the digital identifier of the software component 150 is related to the particular digital identifier, as further described with reference to FIG. 1. To illustrate, software components with related digital identifiers may be copies of each other, different versions of each other, or related in other ways. Related software components may have similar behavior. The procedures recommended by the data analyzer 146 may include determining whether executing the software component 150 in the target operating system 160 has similar effects as executing the particular software component with the related digital identifier.

The method 900 may also include storing the first data in the database along with the first digital identifier, at 912. For example, the data analyzer 146 of FIG. 1 may store data indicating the recommended procedures in the database 108. The data analyzer 146 may include the data indicating the recommended procedures in the analysis data 130. The method 900 may proceed to 914.

As illustrated in FIG. 10, the method 900 may continue at 914 from FIG. 9. The method 900 may include analyzing the first software component based on the recommended procedures, at 1008. For example, the data analyzer 146 of FIG. 1 may analyze the software component 150 based on the recommended procedures, as further described with reference to FIG. 1.

The method 900 may include initiating display of a plurality of analysis options indicating the recommended procedures, at 1002, receiving a user selection indicating one or more analysis options of the plurality of analysis options, at 1004, and analyzing the first software component based on the one or more selected analysis options, at 1006. For example, the analysis manager 144 of FIG. 1 may initiate display of a plurality of analysis options including the recommended procedures by sending the analysis data 130 to the client system(s) 102. The analysis data 130 may indicate the recommended procedures. In response to the analysis data 130, the client system(s) 102 may display the plurality of analysis options. The analyst may select one or more of the analysis options. The client system(s) 102 may send data indicating the selected one or more analysis options to the analysis manager 144. The data analyzer 146 may analyze the software component 150 based on the selected one or more analysis options.

The method 900 may also include generating second data indicating results of the analysis, at 1010. For example, the data analyzer 146 of FIG. 1 may generate data indicating the results of analyzing the software component 150, as further described with reference to FIG. 1.

The method 900 may further include storing the second data in the database along with first digital identifier, at 1012. For example, the data analyzer 146 of FIG. 1 may store the generated data in the database 108. The method 1000 may also include sending, to the second device, the second data indicating the results of the analysis, at 1014. For example, the data analyzer 146 of FIG. 1 may include the generated data in the analysis data 130 and may send the analysis data 130 to the client system(s) 102.

The method 900 may further include initiating display of the results of the analysis, at 1016. For example, the data analyzer 146 may initiate display of the generated data by sending the analysis data 130 to the client system(s) 102. The client system(s) 102 may display the analysis data 130 in response to receiving the analysis data 130.

Figure 11:
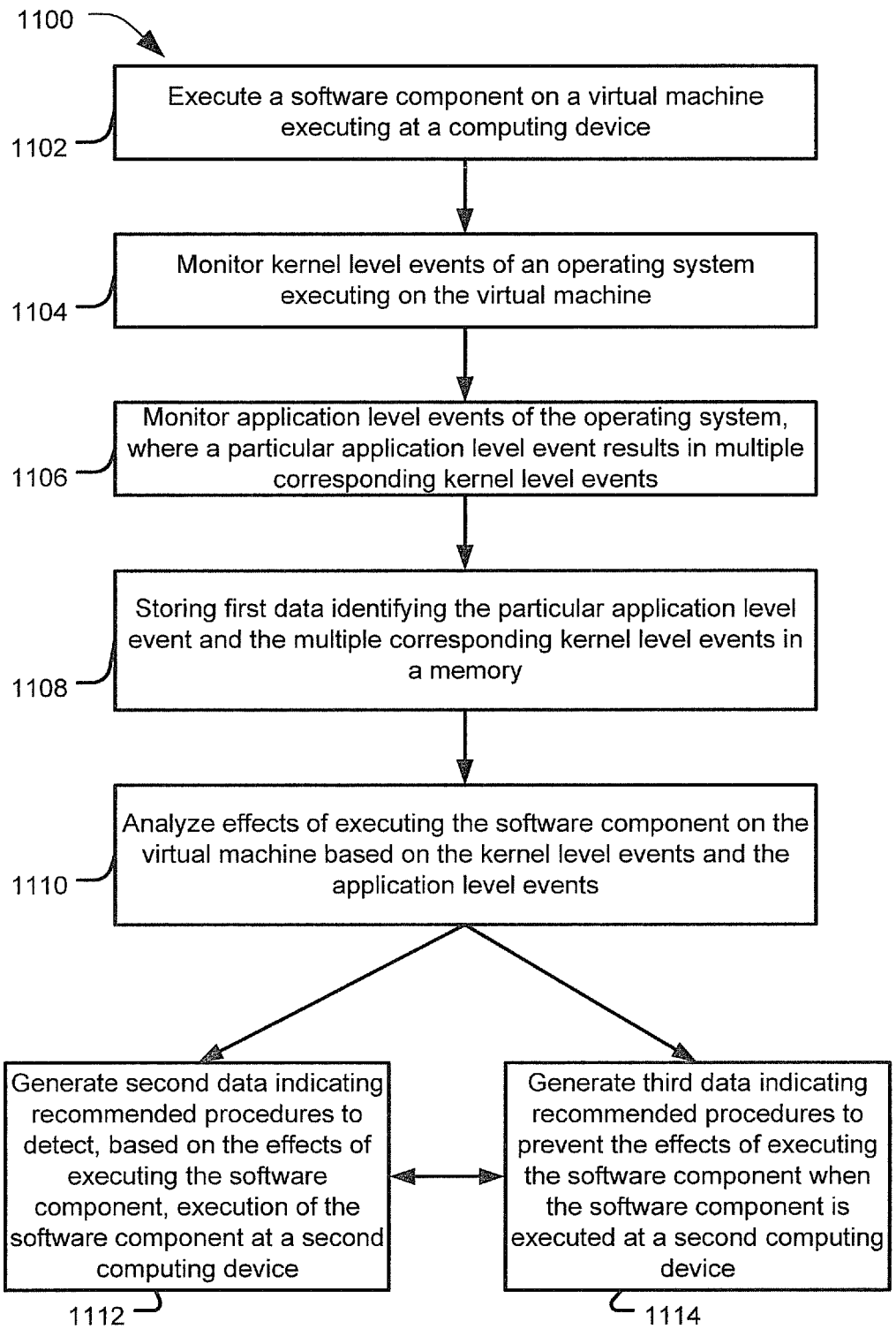
FIG. 11 is a flow chart illustrating a particular embodiment of another method of analyzing a software component.

Referring to FIG. 11, a flow chart of a particular illustrative embodiment of a method of analyzing a software component is shown and is generally designated 1100. The method 1100 may be executed by the system 100 of FIG. 1.

The method 1100 may include executing a software component on a virtual machine executing at a computing device, at 1102. For example, the analysis manager 144 of FIG. 1 may initiate execution of the software component 150 on the virtual machine 154, as further described with reference to FIG. 1.

The method 1100 may also include monitoring kernel level events of an operating system executing on the virtual machine, at 1104. For example, the kernel level sensor 156 of FIG. 1 may monitor kernel level events of the target operating system 160, as further described with reference to FIGS. 1 and 2.

The method 1100 may further include monitoring application level events of the operating system, at 1106. For example, the application level sensor 158 of FIG. 1 may monitor application level events of the target operating system 160, as further described with reference to FIGS. 1 and 2. A particular application level event may result in multiple corresponding kernel level events.

The method 1100 may also include storing first data identifying the particular application level event and the multiple corresponding kernel level events in a memory, at 1108. For example, the sensor layer 152 of FIG. 1 may store data identifying the particular application level event and the multiple corresponding kernel level events in the memory 180, the database 108, or both.

The method 1100 may further include analyzing effects of executing the software component on the virtual machine based on the kernel level events and the application level events, at 1110. For example, the data analyzer 146 of FIG. 1 may analyze the effects of executing the software component 150 on the virtual machine 154 based on the kernel level events and the application level events, as further described with reference to FIG. 1.

The method 1100 may also include generating second data indicating recommended procedures to detect, based on the effects of executing the software component, execution of the software component at a second computing device, at 1112. For example, the data analyzer 146 of FIG. 1 may generate data indicating recommended procedures to detect execution of the software component 150 at another computing device, as further described with reference to FIG. 1. The recommended procedures to detect execution a software component may be used to detect malware or to prepare malware detection definitions for use in a security software application.

The method 1100 may further include generating third data indicating recommended procedures to prevent the effects of executing the software component when the software component is executed at a second computing device, at 1114. For example, the data analyzer 146 of FIG. 1 may generate data indicating recommended procedures to prevent the effects of executing the software component 150 when the software component 150 is executed at another computing device, as further described with reference to FIG. 1. The recommended procedures to prevent effects of executing a software component may be used to mitigate security vulnerabilities of a system or to prepare strategies for use in a security software application.

Thus, method 1100 may enable monitoring events initiated by a software component both at the application level and at the kernel level. The kernel level monitoring may be difficult to detect, and hence difficult to circumvent, by the software component. The application level monitoring may generate data that is easy to understand for an analyst. Having both kernel level monitoring and application level monitoring may result in a robust and user-friendly analysis system.

Figure 12:
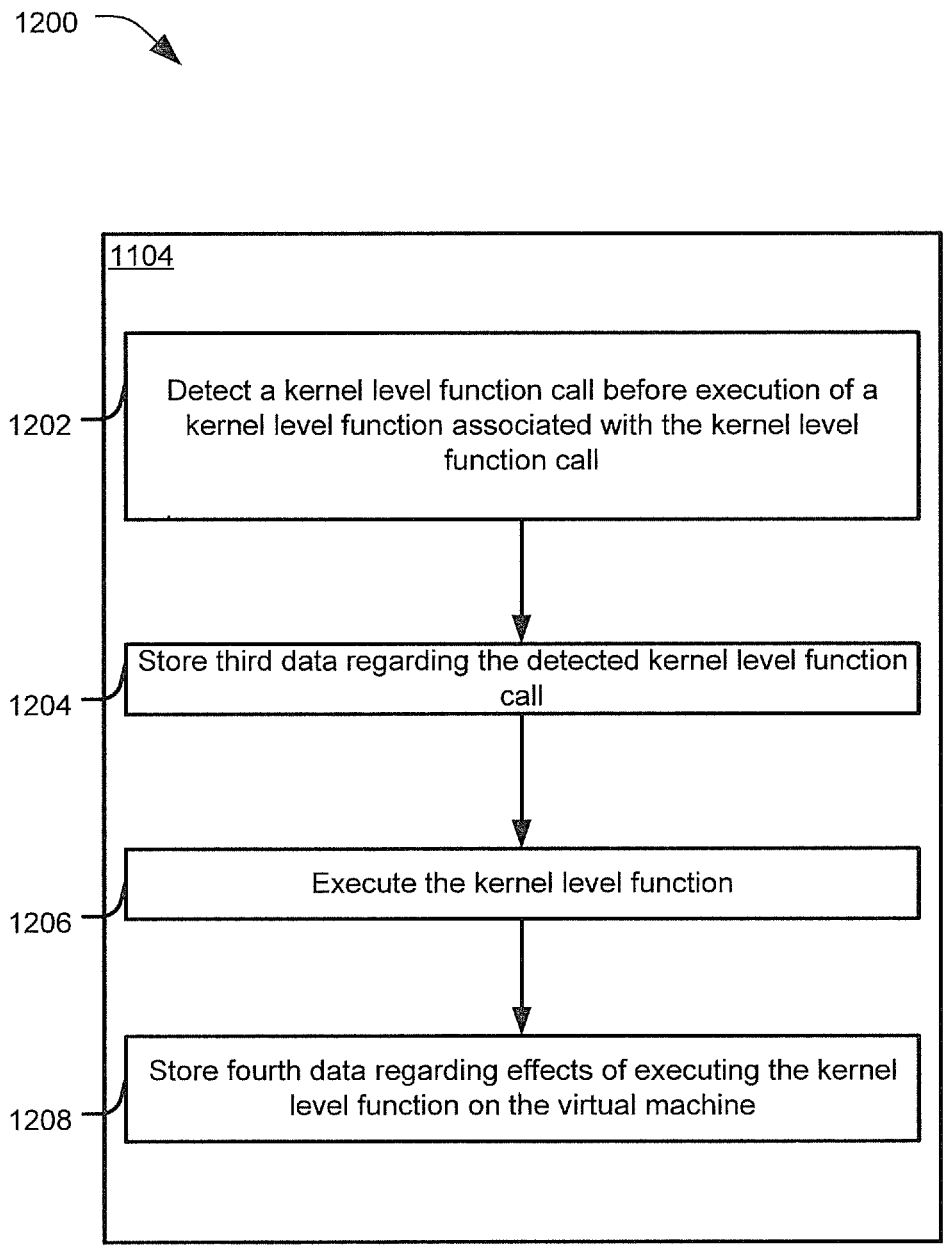
FIG. 12 is a flow chart illustrating a particular embodiment of another method of analyzing a software component and may correspond to operation 1104 of FIG. 11.

Referring to FIG. 12, a flow chart of a particular illustrative embodiment of a method of analyzing a software component is shown and is generally designated 1200. In a particular embodiment, the method 1200 may correspond to operation 1104 of FIG. 11.

The method 1200 may include detecting a kernel level function call before execution of a kernel level function associated with the kernel level function call, at 1202. For example, the kernel level sensor 156 of FIG. 1 may detect a kernel level function call before execution of a kernel level function associated with the kernel level function call, as described with reference to FIG. 1.

The method 1200 may also include storing third data regarding the detected kernel level function call, at 1204. For example, the kernel level sensor 156 of FIG. 1 may store data regarding the detected kernel level function call, as described with reference to FIG. 1.

The method 1200 may further include executing the kernel level function, at 1206. For example, the processor 170 of FIG. 1 may execute the kernel level function on the virtual machine 154, as further described with reference to FIG. 1. In a particular embodiment, the kernel level sensor 156 may passively observe the detected kernel level function call and store the data regarding the detected kernel level function call. In another particular embodiment, the kernel level sensor 156 may intercept the detected kernel level function call, store the data regarding the detected kernel level function call, and initiate execution of the kernel level function associated with the detected kernel level function call.

The method 1200 may also include storing fourth data regarding effects of executing the kernel level function on the virtual machine, at 1208. For example, the kernel level sensor 156, the virtual machine 154, or both, of FIG. 1 may store data regarding effects of executing the kernel level function on the virtual machine 154, as further described with reference to FIG. 1.

Thus, method 1200 may enable monitoring of kernel level events initiated by the software component 150. Data regarding the kernel level events and the effects of executing the kernel level events on a virtual machine may be stored for analysis. The kernel level events may include events initiated to implement an application level event. In this case, the kernel level sensor 156, the virtual machine 154, or both, may store data identifying the application level event to which the kernel level events are related.

Figure 13:
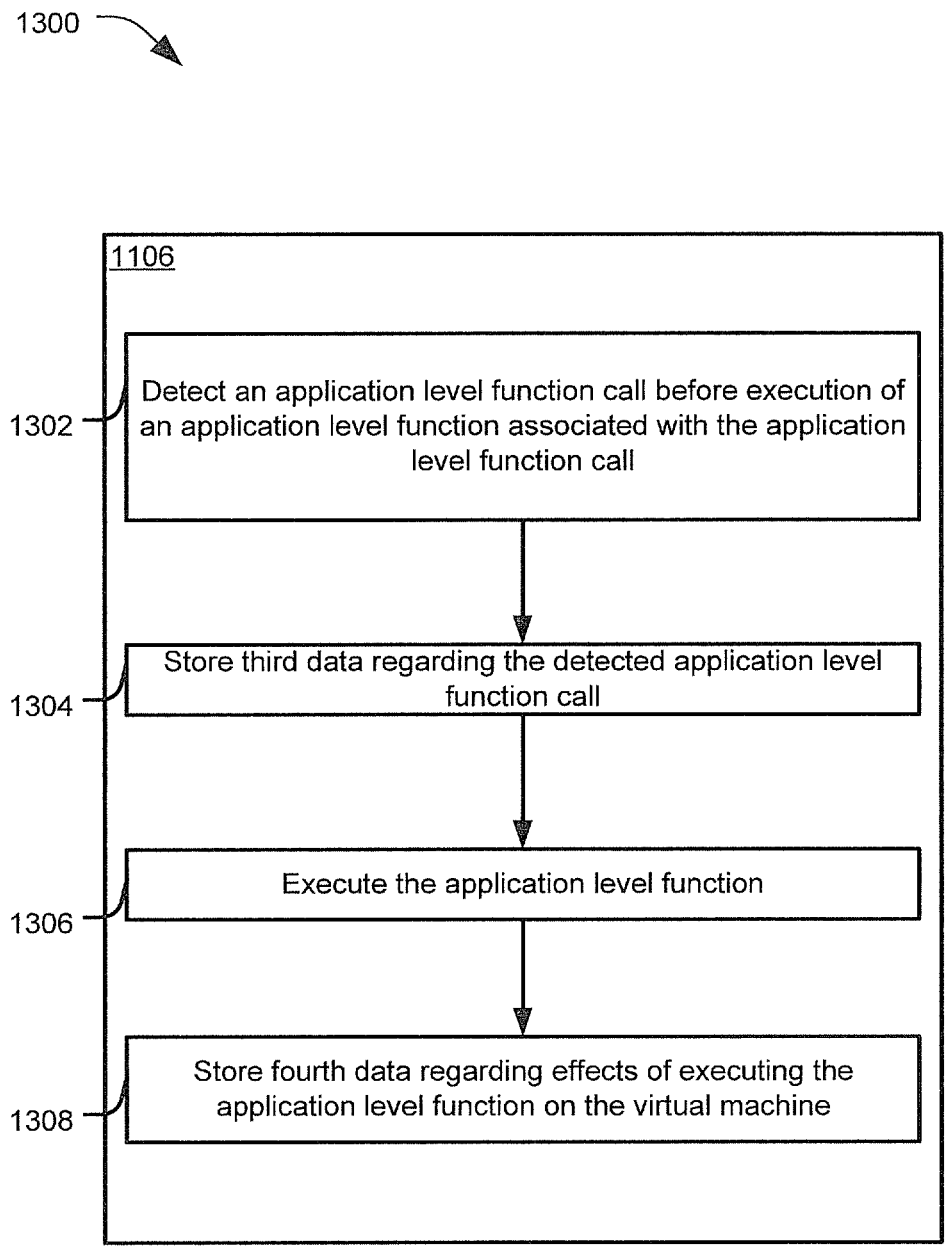
FIG. 13 is a flow chart illustrating a particular embodiment of another method of analyzing a software component and may correspond to operation 1104 of FIG. 11.

Referring to FIG. 13, a flow chart of a particular illustrative embodiment of a method of analyzing a software component is shown and is generally designated 1300. In a particular embodiment, the method 1300 may correspond to operation 1106 of FIG. 11.

The method 1300 may include detecting an application level function call before execution of an application level function associated with the application level function call, at 1302. For example, the application level sensor 158 of FIG. 1 may detect an application level function call before execution of a corresponding application level function, as further described with reference to FIG. 1.

The method 1300 may also include storing third data regarding the detected application level function call, at 1304. For example, the application level sensor 158, the virtual machine 154, or both, of FIG. 1 may store data regarding the detected application level function call, as further described with reference to FIG. 1.

The method 1300 may further include executing the application level function, at 1306. For example, the processor 170 of FIG. 1 may execute the application level function on the virtual machine 154, as further described with reference to FIG. 1. In a particular embodiment, the application level sensor 158 may passively observe the detected application level function call and store the data regarding the detected application level function call. In another particular embodiment, the application level sensor 158 may intercept the detected application level function call, store the data regarding the detected application level function call, and initiate execution of the application level function associated with the detected application level function call.

The method 1300 may also include storing fourth data regarding effects of executing the application level function on the virtual machine, at 1308. For example, the application level sensor 158, the virtual machine 154, or both, of FIG. 1 may store data regarding effects of executing the application level function on the virtual machine 154, as further described with reference to FIG. 1.

Thus, method 1300 may enable monitoring of application level events initiated by the software component 150. Data regarding the application level events and the effects of executing the application level events on a virtual machine may be stored for analysis.

Figure 14:
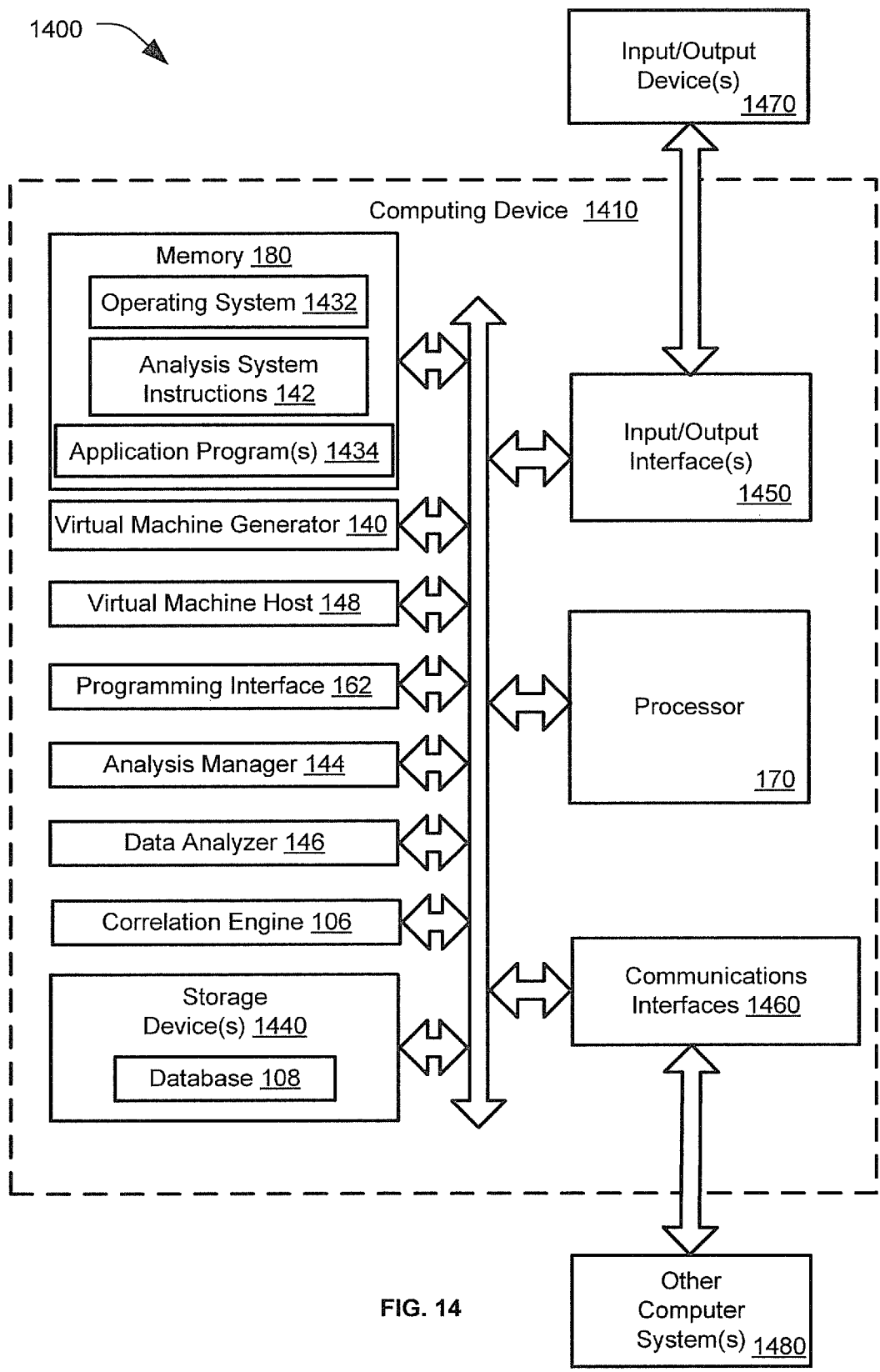
FIG. 14 is a block diagram of a particular illustrative embodiment of a computing environment to analyze a software component.

FIG. 14 is a block diagram of a computing environment 1400 including a general purpose computing device 1410 to support embodiments of computer-implemented methods and computer-executable program instructions (or code) according to the present disclosure. For example, the computing device 1410, or portions thereof, may execute instructions to analyze a software component. In a particular embodiment, the computing device 1410 may include, be included with, or correspond to the system 100 of FIG. 1.

The computing device 1410 may include the processor 170 of FIG. 1. The processor 170 may communicate with the memory 180, the virtual machine generator 140, the virtual machine host 148, the programming interface 162, the analysis manager 144, the data analyzer 146, the correlation engine 106 of FIG. 1, one or more storage devices 1440, one or more input/output interfaces 1450, one or more communications interfaces 1460, or a combination thereof. In a particular embodiment, the virtual machine generator 140, the virtual machine host 148, the programming interface 162, the analysis manager 144, the data analyzer 146, and the correlation engine 106 are instructions (e.g., the analysis system instructions 142) stored in the memory 180 and executable by the processor 170 to perform functions described with respect to FIG. 1.

The memory 180 may include volatile memory devices (e.g., random access memory (RAM) devices), nonvolatile memory devices (e.g., read-only memory (ROM) devices, programmable read-only memory, and flash memory), or both. The memory 180 may include an operating system 1432, which may include a basic/input output system for booting the computing device 1410 as well as a full operating system to enable the computing device 1410 to interact with users, other programs, and other devices. The memory 180 may include one or more application programs 1434, such as a software component analysis application, e.g., an application that is executable to analyze a software component. The memory 180 may include the analysis system instructions 142 of FIG. 1, which may be executable by the processor 170, e.g., instructions that are executable to analyze a software component.

The processor 170 may also communicate with one or more storage devices 1440. For example, the one or more storage devices 1440 may include nonvolatile storage devices, such as magnetic disks, optical disks, or flash memory devices. The storage devices 1440 may include both removable and non-removable memory devices. The storage devices 1440 may be configured to store an operating system, images of operating systems, applications, and program data. In a particular embodiment, the storage devices 1440 may include the database 108 of FIG. 1. In a particular embodiment, the memory 180, the storage devices 1440, or both, include tangible, non-transitory computer-readable media.

The processor 170 may also communicate with one or more input/output interfaces 1450 that enable the computing device 1410 to communicate with one or more input/output devices 1470 to facilitate user interaction. The input/output interfaces 1450 may include serial interfaces (e.g., universal serial bus (USB) interfaces or Institute of Electrical and Electronics Engineers (IEEE) 1394 interfaces), parallel interfaces, display adapters, audio adapters, and other interfaces. The input/output devices 1470 may include keyboards, pointing devices, displays, speakers, microphones, touch screens, and other devices. The processor 170 may detect interaction events based on user input received via the input/output interfaces 1450. Additionally, the processor 170 may send a display to a display device via the input/output interfaces 1450.

The processor 170 may communicate with other computer systems 1480 via the one or more communications interfaces 1460. The one or more communications interfaces 1460 may include wired Ethernet interfaces, IEEE 802 wireless interfaces, other wireless communication interfaces, or other network interfaces. The other computer systems 1480 may include host computers, servers, workstations, and other computing devices. For example, the other computer systems 1480 may include the client system(s) 102, the database 108, the correlation engine 106 of FIG. 1, or a combination thereof.

Thus, in particular embodiments, a computer system may be able to analyze a software component. For example, the analysis system instructions 142 may be executable by the processor 170 to analyze a software component within a virtual machine running a target operating system.

Embodiments described above are illustrative and do not limit the disclosure. It is to be understood that numerous modifications and variations are possible in accordance with the principles of the present disclosure.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, method steps may be performed in a different order than is shown in the figures or one or more method steps may be omitted. Accordingly, the disclosure and the figures are to be regarded as illustrative rather than restrictive.

Moreover, although specific embodiments have been illustrated and described herein, it is to be appreciated that any subsequent arrangement designed to achieve the same or similar results may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, the claimed subject matter may be directed to fewer than all of the features of any of the disclosed embodiments.

What is claimed is:

1. A method comprising:
    receiving, at a computing device, a request to analyze a software component, wherein the request indicates a target operating system, wherein the target opera system is a custom operating system derived from an image from a golden master source;
    generating a virtual machine at the computing device, wherein the virtual machine implements the target operating system;
    executing the software component in the target operating system on the virtual machine; and
    generating data indicating effects of executing the software component on the virtual machine, wherein the data identifies at least one of a function call, a memory modification, a file access, a network access, a registry modification, a file system modification, or a system resource utilization.

2. The method of claim 1, wherein a plurality of operating systems, stored at the computing device, include the target operating system, and wherein the virtual machine is generated using a copy of the target operating system.

3. The method of claim 1, wherein the virtual machine is generated to emulate a particular client operating environment indicated in the request.

4. The method of claim 1, wherein the data is generated by sensor functions that monitor the virtual machine.

5. The method of claim 1, further comprising removing the virtual machine from the computing device after execution of the software component.

6. The method of claim 1, wherein the software component includes malware.

7. The method of claim 1, wherein the request includes the software component.

8. A system comprising:
    a processor; and
    a memory storing instructions that, when executed by the processor, cause the processor to perform operations comprising:
        receiving a request to analyze a first software component, wherein the request indicates a target operating system, wherein the target operating system is a custom operating system derived from an image from a golden master source;
        generating a virtual machine, wherein the virtual machine implements the target operating system;
        executing the first software component in the target operating system on the virtual machine; and
        generating first data associated with execution of the first software component on the virtual machine, wherein the first data identifies at least one of a function call, a memory modification, a file access, a network access, a registry modification, a file system modification, or a system resource utilization.

9. The system of claim 8, wherein the first data is generated by sensor functions that monitor the virtual machine.

10. The system of claim 8, wherein the first data indicates effects of executing kernel level events of the software component on the virtual machine.

11. The system of claim 8, wherein the operations further comprise generating a report based on the first data, wherein the report is generated using a standardized reporting language, and wherein the request indicates the standardized reporting language.

12. The system of claim 11, wherein the operations further comprise:
    storing the first data in a database along with an identifier of the first software component; and
    storing the report in the database along with the identifier of the first software component.

13. The system of claim 8, wherein the operations further comprise comparing the first data to information in a database to generate a result.

14. The system of claim 13, wherein the information in the database is related to a second software component and wherein the operations further comprise identifying similar effects of executing the first software component and executing the second software component based on the result.

15. The system of claim 14, wherein the operations further comprise identifying distinct effects of executing the first software component and the second software component based on the result.

16. The system of claim 15, wherein the operations further comprise generating second data indicating the similar effects and the distinct effects.

17. The system of claim 13, wherein the operations further comprise:
    identifying a second software component that has a same effect upon execution as the first software component, wherein the second software component is identified based on the information in the database; and
    generating second data indicating the second software component.

18. A non-transitory computer-readable storage device storing instructions that, when executed by a processor, cause the processor to perform operations comprising:
    receiving a request to analyze a software component, wherein the request indicates a target operating system, wherein the target operating system is a custom operating system derived from an image from a golden master source;
    generating a virtual machine at a computing device, wherein the virtual machine implements the target operating system;
    executing the software component in the target operating system on the virtual machine; and
    generating first data associated with execution of the software component on the virtual machine, wherein the first data identifies at least one of a function call, a memory modification, a file access, a network access, a registry modification, a file system modification, or a system resource utilization.

19. The non-transitory computer-readable storage device of claim 18, wherein the first data indicates effects of executing application level events of the software component on the virtual machine.

20. The non-transitory computer-readable storage device of claim 18, wherein the operations further comprise:
    comparing the first data to second data to generate a result, wherein the second data indicates publicized effects of executing the software component; and determining whether the effects of executing the software component on the virtual machine match the publicized effects based on the result.

* * * * *